(12) United States Patent
Nishiguchi et al.

(10) Patent No.: US 8,641,182 B2
(45) Date of Patent: Feb. 4, 2014

(54) INK JET INK, INK CARTRIDGE, AND INK JET RECORDING METHOD

(75) Inventors: Kenji Nishiguchi, Yokohama (JP); Mitsuru Ishii, Kamagaya (JP); Sachie Furukawa, Tokyo (JP); Daiji Okamura, Tokyo (JP); Kousuke Yamasaki, Kawasaki (JP); Yuuki Nishino, Kawasaki (JP); Yoichi Takada, Yokohama (JP); Hirofumi Ichinose, Tokyo (JP); Hiroshi Tomioka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 149 days.

(21) Appl. No.: 13/216,544

(22) Filed: Aug. 24, 2011

(65) Prior Publication Data

US 2012/0050384 A1    Mar. 1, 2012

(30) Foreign Application Priority Data

Aug. 31, 2010  (JP) ................................ 2010-193848
Aug. 31, 2010  (JP) ................................ 2010-194043

(51) Int. Cl.
*C09D 11/00* (2006.01)

(52) U.S. Cl.
USPC ...................................................... 347/100

(58) Field of Classification Search
USPC ...................................................... 347/100
See application file for complete search history.

(56) References Cited

U.S. PATENT DOCUMENTS

| 2003/0109600 | A1* | 6/2003 | Shirota et al. | ................. | 523/160 |
| 2004/0017406 | A1 | 1/2004 | Kato | | |
| 2010/0143589 | A1* | 6/2010 | Spinelli et al. | ................. | 427/256 |

FOREIGN PATENT DOCUMENTS

| EP | 556649 A1 | 8/1993 | | |
| JP | 2005-179482 A | 7/2005 | | |
| JP | 2008-63500 A | 3/2008 | | |
| JP | 2008-88427 A | 4/2008 | | |
| JP | 2009084397 A | * 4/2009 | ............. | C09D 17/00 |
| WO | 2010/024858A A1 | 3/2010 | | |

* cited by examiner

*Primary Examiner* — Laura Martin
(74) *Attorney, Agent, or Firm* — Canon USA Inc. IP Division

(57) ABSTRACT

An ink jet ink including a pigment and an ABC triblock polymer, wherein the above-described ABC triblock polymer is formed from an A block having an aryl group, a B block having a unit represented by the following general formula (1), and a C block having a unit represented by the following general formula (2).

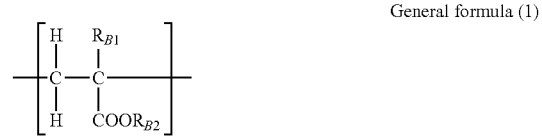

General formula (1)

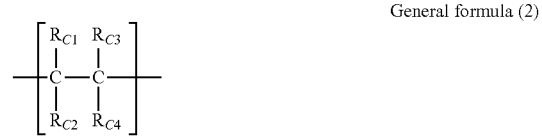

General formula (2)

14 Claims, No Drawings

INK JET INK, INK CARTRIDGE, AND INK JET RECORDING METHOD

BACKGROUND OF THE INVENTION

1. Field of the Invention

The present invention relates to an ink jet ink, an ink cartridge by using the above-described ink, and an ink jet recording method.

2. Description of the Related Art

Regarding an image recorded on a recording medium by using a pigment ink, a phenomenon in which the image is observed to take on a color different from the color intrinsic to the pigment recorded in the image depending on the angle of observation of the image (bronze phenomenon) occurs. An occurrence of this is attributable to difference in refractive index depending on a wavelength in a visible light region when light is refracted at the surface of a pigment layer constituting an image.

In order to solve the bronze phenomenon, methods in which inorganic fine particles or water-insoluble polymer fine particles are contained in a pigment ink have been proposed previously (refer to Japanese Patent Laid-Open No. 2005-179482 and Japanese Patent Laid-Open No. 2008-63500). Japanese Patent Laid-Open No. 2005-179482 discloses that a bronze phenomenon of an image is improved by further containing a titanium dioxide pigment serving as inorganic fine particles in a pigment ink. Japanese Patent Laid-Open No. 2008-63500 discloses that a bronze phenomenon and glossiness of an image are improved by an aqueous pigment ink containing water-insoluble cross-linked polymer particles. Furthermore, a method by using a core-shell type pigment, in which pigment particles are covered with a water-insoluble polymer has been proposed (refer to Japanese Patent Laid-Open No. 2008-88427). Japanese Patent Laid-Open No. 2008-88427 discloses that a bronze phenomenon and glossiness of an image are improved by an ink containing a core-shell type pigment covered with a water-insoluble cross-linked polymer. These methods suppress variations in refractive index at an image surface through the use of the fact that the surface refractive indices of inorganic fine particles and a water-insoluble polymer exhibits no dependence on wavelength and, therefore, these fine particles are present in such a way as to surround pigment particles when an image is formed.

SUMMARY OF THE INVENTION

An ink jet ink according to aspects of the present invention includes a pigment and an ABC triblock polymer formed from an A block having an aryl group, a B block having a unit represented by the following general formula (1), and a C block having a unit represented by the following general formula (2),

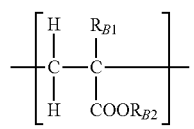

General formula (1)

in the general formula (1), $R_{B1}$ represents a hydrogen atom or a methyl group and $R_{B2}$ represents an alkyl group having the carbon number of 1 to 8, a cycloalkyl group having the carbon number of 4 to 8, or a hydroxy alkyl group having the carbon number of 2 to 8, and

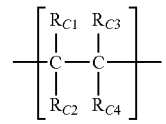

General formula (2)

in the general formula (2), at least one of $R_{C1}$ to $R_{C4}$ is a —COOH group, an —$R_{C5}$—COOH group, or a salt thereof, the remainder is a hydrogen atom, an alkyl group having the carbon number of 1 to 8, or a cycloalkyl group having the carbon number of 4 to 8, and $R_{C5}$ is an alkylene group having the carbon number of 1 to 5.

Further features of the present invention will become apparent from the following description of exemplary embodiments.

DESCRIPTION OF THE EMBODIMENTS

Aspects of the present invention will be described below in detail with reference to embodiments. An ink jet ink (hereafter referred to as an "ink") according to aspects of the present invention includes a pigment and an ABC triblock polymer formed from an A block having an aryl group, a B block having a unit represented by the following general formula (1), and a C block having a unit represented by the following general formula (2). By the way, at least a part of components constituting salts may dissociate in an ink and be present as ions. However, in the present invention, this is included in the expression of "salt is contained" for the sake of convenience.

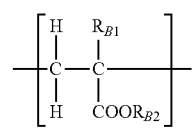

General formula (1)

In the general formula (1), $R_{B1}$ represents a hydrogen atom or a methyl group and $R_{B2}$ represents an alkyl group having the carbon number of 1 to 8, a cycloalkyl group having the carbon number of 4 to 8, or a hydroxy alkyl group having the carbon number of 2 to 8.

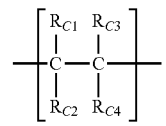

General formula (2)

In the general formula (2), at least one of $R_{C1}$ to $R_{C4}$ is a —COOH group, an —$Rc_5$-COOH group, or a salt thereof, the remainder is a hydrogen atom, an alkyl group having the carbon number of 1 to 8, or a cycloalkyl group having the carbon number of 4 to 8, and $R_{C5}$ is an alkylene group having the carbon number of 1 to 5.

As a result of studies by the present inventors, it was found that the methods by using the inorganic fine particles and the water-insoluble polymers in the related art improved the bronze phenomenon of the image, but the glossiness of the image was reduced as compared with that in the case where inorganic fine particles and water-insoluble polymers were not used. Moreover, it was found that the storage stability and the ejection stability of the ink were at very low levels.

For example, in the case where the inorganic fine particles are used as in Japanese Patent Laid-Open No. 2005-179482, both the inorganic fine particles and the pigment are hydrophobic and, thereby, aggregation occurs easily because of hydrophobic interaction, and it is difficult to control dispersion of the inorganic fine particles, so that it is difficult to allow the inorganic fine particles to present all over a recording region uniformly. Consequently, the recording surface becomes uneven to a great extent, and the glossiness of the image is reduced significantly. The inorganic fine particles are water-insoluble and have a large specific gravity. Therefore, the inorganic fine particles precipitate in an ink cartridge and in the vicinity of an ejection orifice easily. In the ink, the inorganic fine particles and the pigment aggregate easily because of hydrophobic interaction, so that the storage stability and the ejection stability of the ink are at very low levels. As another example, in the case where the water-insoluble polymer fine particles are used, as in Japanese Patent Laid-Open No. 2008-63500, the storage stability and the ejection stability of the ink are at very low levels for the same reason as that in the case of the inorganic fine particles. Regarding the glossiness of the image, polymer fine particles are fused with each other at a temperature higher than or equal to a minimum film-forming temperature, so that unevenness of the recording surface is reduced, but the glossiness of the image is reduced and becomes insufficient as compared with those in the case where the inorganic fine particles are used.

In the case where the core-shell type pigment covered with a water-insoluble cross-linked polymer is used, as in Japanese Patent Laid-Open No. 2008-88427, the storage stability and the ejection stability of the ink are at very low levels because the core-shell type pigment in itself is hydrophobic. Furthermore, hydrophobic core-shell type pigments aggregate with each other easily and control of dispersion is difficult, so that the glossiness of the image is reduced and becomes insufficient.

As described above, regarding the method, in which the inorganic fine particles and the water-insoluble polymers are contained in the pigment ink, in the related art, in the case where suppression of the bronze phenomenon of the image is intended, the glossiness of the image, the storage stability of the ink, and the ejection stability of the ink were found to be degraded. Then, the present inventors studied pigment inks containing water-soluble polymers. The ink containing a water-soluble polymer exhibited excellent storage stability and ejection stability as compared with those of the inks containing the inorganic fine particles and the water-insoluble polymers. Furthermore, the glossiness of the image was not reduced because the polymer was able to be present uniformly in a recording region. Meanwhile, the water-soluble polymer permeated into a recording medium together with water and a water-soluble organic solvent in the ink easily. Therefore, in order that the bronze phenomenon was able to be suppressed, that is, a sufficient amount of polymer was present around pigment particles even when a part of the water-soluble polymer permeated into the recording medium, it was necessary to contain large amounts of water-soluble polymer in the ink. However, in this case, as the content of the polymer in the ink increased, the viscosity of the ink increased and, thereby, the ejection stability of the ink was reduced.

In consideration of the above-described results, the present inventors studied the problem over and over again, and found that the bronze phenomenon was suppressed while the glossiness of the image was maintained and the storage stability and the ejection stability of the ink were able to be improved by containing a specific ABC triblock polymer in the pigment ink.

The specific ABC triblock polymer contained in the ink according to aspects of the present invention is concretely a polymer formed from the A block having an aryl group, the B block having a unit represented by the above-described general formula (1), and the C block having a unit represented by the above-described general formula (2).

In the ABC triblock polymer according to aspects of the present invention, the A block is a low-hydrophilicity (high-hydrophobicity) block, and the C block is a high-hydrophilicity block. Furthermore, the B block between the A block and the C block has the hydrophilicity between that of the A block and that of the C block. As described above, the ABC triblock polymer used for the ink according to aspects of the present invention has a structure having a hydrophobic segment and a hydrophilic segment at opposite ends. Consequently, the hydrophobic A block and a pigment particle surface having the hydrophobicity as well are attracted to each other due to a hydrophobic interaction, so that the polymer can be adsorbed by pigment particles efficiently. Then, the polymer takes on a structure in which the high-hydrophilicity C block present at the end opposite to the A block is oriented in the dispersion medium and, therefore can be dispersed in the ink stably.

Meanwhile, regarding polymers which are not adsorbed by pigment particles, some polymers are associated due to the hydrophobic interaction through the hydrophobic A block and are present with a hydrophobic segment inside and a hydrophilic segment outside. Consequently, the polymers not adsorbed by the pigment particles can be present in the ink while being dispersed stably.

In this manner, both the pigment particles adsorbing the polymer and the polymer not adsorbed by the pigment particles are dispersed stably, so that the storage stability and the ejection stability of the ink are improved. Furthermore, in application to the recording medium, the polymer can present in the recording region uniformly, so that reduction in glossiness of the image can be suppressed.

Moreover, regarding the ink according to aspects of the present invention, a significantly high effect of suppressing the bronze phenomenon was obtained by using the above-described ABC triblock polymer as compared with those of the methods in which inorganic fine particles and water-insoluble polymers are used in the related art. While the reason for this is not certain, the present inventors believe it may be for the reason as described below.

Regarding the ink containing hydrophobic fine particles, e.g., inorganic fine particles and water-insoluble polymer fine particles, in the related art, the hydrophobic interaction is exerted not only between hydrophobic pigment particles and hydrophobic fine particles, but also among pigment particles and among fine particles, as a matter of course. Consequently, fine particles may be easily localized on the pigment particle surface. Therefore, exposed surfaces not covered with fine particles tend to become present on the pigment particle surface. At this time, in order to reduce the exposed surface, a method in which the content of hydrophobic fine particles is increased has been considered, but the glossiness of the image may be reduced and the ejection stability and the storage stability of the ink may become insufficient in such a method. On the other hand, as described above, the triblock polymer used for the ink according to aspects of the present invention has a structure in which the hydrophilic portion and the hydrophobic portion are separated clearly and, therefore, both the attractive force and the repulsive force are applied between a plurality of polymer molecules. Consequently, it is believed that localization of polymer does not occur easily on the pigment particle surface and an exposed surface not covered with the polymer is reduced as compared with that in the case where hydrophobic fine particles are used.

At this time, in the case where an AC diblock polymer, in which the A block and the C block are directly bonded without through the B block, is used in contrast to the ABC triblock polymer used for the ink according to aspects of the present invention, the above-described effect is not obtained. The reason for this is believed to be that in the case where the AC diblock polymer is used, the hydrophobic A block and the hydrophilic C block are present very close to each other and, thereby, two contrary properties of the hydrophilicity and the hydrophobicity are not exerted favorably in a functionally separated manner.

On the basis of the above-described mechanism, effects specific to aspects of the present invention are obtained, that is, the bronze phenomenon is suppressed without reducing the glossiness of an image and excellent storage stability and ejection stability of ink are obtained, by using the ink according to aspects of the present invention even though these effects are not achieved by the methods in the related art.

Ink

Each of components constituting the ink according to aspects of the present invention will be described below.

ABC Triblock Polymer

According to aspects of the present invention, the "ABC triblock polymer" refers to a polymer having a structure in which three different types of polymers, the A block, the B block, and the C block, are joined by covalent bonds in the order of A, B, and C. Each of the blocks may be a polymer produced by homopolymerizing a single type of monomer or a random polymer produced by random-copolymerizing at least two types of monomers insofar as the polymer is different from the other two blocks. However, the case where each block is a block polymer of at least two types of monomers, such as, the case where the A block is furthermore a binary block polymer, is not included in the "ABC triblock polymer" in the present invention. By the way, hereafter the terms "(meth)acrylic acid" and "(meth)acrylate" refer to "acrylic acid, methacrylic acid" and "acrylate, methacrylate", respectively.

Monomer Constituting A Block

As for the monomer serving as a unit constituting the A block through polymerization, an alpha, beta-ethylenic unsaturated monomer having an aryl group is mentioned. In the present invention, the "aryl group" refers to a functional group or a substituent derived from an aromatic hydrocarbon, e.g., a phenyl group, a benzyl group, a tolyl group, an o-xylyl group, or a naphthyl group.

Examples of alpha, beta-ethylenic unsaturated monomers having an aryl group include aromatic vinyl compounds, e.g., styrene and alpha-methyl styrene; ester compounds synthesized from an alpha, beta-ethylenic unsaturated carboxylic acid and an alkyl alcohol having an aryl group, e.g., benzyl (meth)acrylate and 2-phenoxyethyl (meth)acrylate; amide compounds synthesized from an alpha, beta-ethylenic unsaturated carboxylic acid and an alkylamine having an aryl group, e.g., benzyl(meth)acrylamide and 2-phenoxyethyl (meth) acrylamide; 2-hydroxy-3-phenoxypropyl (meth)acrylate, and 2-(meth)acryloxyethylphthalic acid. According to aspects of the present invention, the A block may be formed by homopolymerizing only one type of alpha, beta-ethylenic unsaturated monomers having an aryl group, or the A block may be formed by random-copolymerizing at least two types thereof. Among them, styrene and benzyl (meth)acrylate can be employed because of the structure with small steric hindrance in such a way as to associate easily. The A block may be formed by random-copolymerizing the alpha, beta-ethylenic unsaturated monomer having an aryl group and "other monomer" described later. At that case, the content (percent by mass) of the "other monomer" may be 35.0 percent by mass or less relative to the content (percent by mass) of the A block. As for the "other monomer" used for the A block, a monomer selected from (meth)acrylic acid ester compounds, (meth)acrylic acid alkylamide compounds, and nitrogen-containing vinyl compounds can be used. According to aspects of the present invention, in particular, the A block can be formed by polymerizing only an alpha, beta-ethylenic unsaturated monomers having an aryl group, that is, the content of the "other monomer" may be 0 percent by mass relative to the content (percent by mass) of the A block.

According to aspects of the present invention, the proportion (percent by mass) of the A block in the ABC triblock polymer may be 20.0 percent by mass or more and 80.0 percent by mass or less relative to a total mass of the ABC triblock polymer. If the proportion is less than 20.0 percent by mass, the ABC triblock polymer is not adsorbed by the pigment easily because of reduction in hydrophobic segments and, therefore, the effect of suppressing the bronze phenomenon is not obtained sufficiently in some cases. On the other hand, if the proportion is more than 80.0 percent by mass, the hydrophobic interaction among the polymers is enhanced and the ABC triblock polymer forms aggregates, so that, in some cases, the glossiness of an image is not obtained sufficiently and effects of improving the storage stability and the ejection stability of the ink are not obtained sufficiently. The acid value of the A block can be made smaller than the acid values of the B block and the C block.

Monomer Constituting B Block

As for the monomer serving as a unit constituting the B block through polymerization, a compound represented by the following general formula (3) is mentioned.

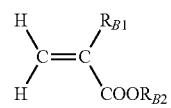

General formula (3)

In the general formula (3), $R_{B1}$ represents a hydrogen atom or a methyl group and $R_{B2}$ represents a straight-chain or branched alkyl group having the carbon number of 1 to 8, a cycloalkyl group having the carbon number of 4 to 8, or a hydroxy alkyl group having the carbon number of 2 to 8.

As for the compounds represented by the general formula (3), (meth)acrylic acid alkyl esters and (meth)acrylic acid hydroxyalkyl esters synthesized from (meth)acrylic acid and straight-chain or branched alkyl alcohols having the carbon number of 1 to 8 or cycloalkyl alcohols having the carbon number of 4 to 8 are mentioned. Specific examples include methyl(meth)acrylate, n-butyl (meth)acrylate, 2-ethylhexyl (meth)acrylate, cyclohexyl (meth)acrylate, 2-hydroxyethyl (meth)acrylate, and 3-methyl-5-hydroxypentyl(meth)acrylate. According to aspects of the present invention, the B block may be formed by homopolymerizing only one type of compound represented by the above-described general formula (3), or the B block may be formed by random-copolymerizing at least two types thereof. The acid value of the B block can be made larger than the acid value of the A block and smaller than the acid values of the C block. The B block may be formed by random-copolymerizing the compound represented by the general formula (3) and "other monomer" described later. As for the "other monomer" used for the B block, (meth)acrylic acid ester compounds, (meth)acrylic acid alkylamide compounds, and nitrogen-containing vinyl compounds can be used. The content (percent by mass) of the "other monomer" may be 35.0 percent by mass or less relative to the content (percent by mass) of the B block.

Monomer Constituting C Block

As for the monomer serving as a unit constituting the C block through polymerization, a compound represented by the following general formula (4) is mentioned.

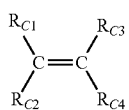

General formula (4)

In the general formula (4), at least one of $R_{C1}$ to $R_{C4}$ is a —COOH group, an —$R_{C5}$—COOH group, or a salt thereof, the remainder is a hydrogen atom, an alkyl group having the carbon number of 1 to 8, or a cycloalkyl group having the carbon number of 4 to 8, and $R_{C5}$ is a substituted or unsubstituted alkylene group having the carbon number of 1 to 5.

Examples of compounds represented by the general formula (4) include unsaturated carboxylic acids and unsaturated dicarboxylic acids, e.g., (meth)acrylic acid, maleic acid, itaconic acid, and fumaric acid; derivatives of unsaturated carboxylic acids and unsaturated dicarboxylic acids; and salts of unsaturated carboxylic acids and unsaturated dicarboxylic acids. Examples of salts include alkali metal (lithium, sodium, potassium, and the like) salts, ammonium salts, and organic ammonium salts. Among them, (meth)acrylic acid can be employed. As for the salt, sodium salts or potassium salts can be employed. According to aspects of the present invention, the C block may be formed by homopolymerizing only one type of compound represented by the above-described general formula (4) or the C block may be formed by random-copolymerizing at least two types. Alternatively, the C block may be formed by random-copolymerizing the compound represented by the general formula (4) and "other monomer" described later in such a way that desired properties are obtained. At this time, as for the "other monomer", monomers exhibiting hydrophobicity to a great extent (monomers having an aryl group and the like) may not be used favorably. The content (percent by mass) of the "other monomer" may be 35.0 percent by mass or less relative to the content (percent by mass) of the C block. According to aspects of the present invention, the C block can be formed by polymerizing only the compound represented by the general formula (4), that is, the content of the "other monomer" may be 0 percent by mass relative to the content (percent by mass) of the C block.

According to aspects of the present invention, the proportion (percent by mass) of the C block in the ABC triblock polymer may be 2.0 percent by mass or more and 35.0 percent by mass or less relative to a total mass of the ABC triblock polymer, such as 2.0 percent by mass or more and 20.0 percent by mass or less. If the proportion is less than 2.0 percent by mass, the hydrophilicity of the ABC triblock polymer is reduced, and the hydrophobic interaction among the ABC polymers is enhanced relatively, so that the ABC triblock polymer may form aggregates. Consequently, in some cases, the glossiness of an image is not obtained sufficiently and effects of improving the storage stability and the ejection stability of the ink are not obtained sufficiently. On the other hand, if the content is more than 35.0 percent by mass, the hydrophilicity is enhanced and hydrophobic segments are reduced relatively, so that the ABC triblock polymer becomes not adsorbed by the pigment easily and, in some cases, the effect of suppressing the bronze phenomenon is not obtained sufficiently. The acid value of the C block can be made larger than the acid values of the A block and the B block.

Other Monomers

Each of A to C blocks of the ABC triblock polymer used for the ink according to aspects of the present invention may be formed by random-copolymerizing the monomer to become a unit constituting each of the above-described blocks and the "other monomer" within the range in which the effects according to aspects of the present invention are obtained. In that case, the content (percent by mass) of the "other monomer" may be 35.0 percent by mass or less relative to the content (percent by mass) of the block for which the "other monomer" is used.

Specific examples of the "other monomers" include (meth)acrylic acid; (meth)acrylic acid ester compounds, e.g., methoxyethyl(meth)acrylate, ethoxyethyl(meth)acrylate, diethylene glycol (meth)acrylate, triethylene glycol (meth)acrylate, tetraethylene glycol (meth)acrylate, polyethylene glycol (meth)acrylate, methoxydiethylene glycol (meth)acrylate, methoxytriethylene glycol (meth)acrylate, methoxytetraethylene glycol (meth)acrylate, methoxypolyethylene glycol (meth)acrylate, cyclohexyl (meth)acrylate, isobornyl(meth) acrylate, and N,N-dimethylaminopropyl (meth)acrylate; (meth)acrylic acid alkylamide compounds, e.g., (meth)acrylamide, dimethyl (meth)acrylamide, N,N-dimethylethyl (meth)acrylamide, N,N-dimethylpropyl (meth)acrylamide, isopropyl(meth)acrylamide, diethyl(meth)acrylamide, and (meth)acryloyl morpholine; and nitrogen-containing vinyl compounds, e.g., N-vinyl acetamide, N-vinyl formamide, N-vinyl pyridine, N-vinyl pyrrolidone, and N-vinyl carbazole.

Method for Synthesizing Triblock Polymer

Any synthesis method generally used in the related art may be used as the method for synthesizing the triblock polymer used for the ink according to aspects of the present invention insofar as the triblock polymer has the above-described structure. Specific examples thereof include methods in the related art, e.g., a living radical polymerization method and a living anion polymerization method. In the case where a block structure derived from an acidic monomer, e.g., (meth)acrylic acid, maleic acid, itaconic acid, or fumaric acid, is introduced into a molecular chain of the triblock polymer, a polymerization method by using an acidic monomer is used. Alternatively, a method in which polymerization is effected by using an alkyl ester monomer of an acidic monomer and, thereafter, the resulting polymer is hydrolyzed is also used.

Method for Analyzing Triblock Polymer

The composition and the molecular weight of the triblock polymer can be analyzed by a method in the related art. Furthermore, it is also possible to ascertain on the basis of an ink containing the triblock polymer by subjecting the ink to centrifugal separation and examining the resulting sediments and a supernatant fluid. Although it is possible to ascertain individually in the state of ink, higher accuracy is ensured through extraction of the triblock polymer. As for a specific method, the ink is subjected to centrifugal separation at 75,000 rpm, and the triblock polymer is extracted from the resulting supernatant fluid. The separated triblock polymer is analyzed by using a high-temperature gas chromatography/ mass spectrometer (high-temperature GC/MS) and, thereby, the types of units constituting the triblock polymer can be identified. The separated triblock polymer is analyzed quantitatively by using a nuclear magnetic resonance method ($^{13}$C-NMR) and a Fourier transform infrared spectrophotometer (FT-IR) and, thereby, the molecular weights, the types, and the contents of these compounds can be determined. The acid value of the triblock polymer can be measured by a titration method. In examples described later, the polymer is dissolved into tetrahydrofuran (THF) and the acid value can be measured through potentiometric titration by using Automatic Potentiometric Titrator AT510 (produced by Kyoto Electronics Manufacturing Co., Ltd.) with a potassium hydroxide ethanol titrant. The weight average molecular weight and the number average molecular weight of the triblock polymer are obtained by gel permeation chromatography (GPC). According to aspects of the present invention, the measurement condition of GPC is as described below.

Apparatus: Alliance GPC 2695 (produced by Waters)
Column: four gang column of Shodex KF-806M (produced by SHOWA DENKO K.K.)
Mobile phase: THF (analytical grade)
Flow rate: 1.0 mL/min
Oven temperature: 40.0° C.
Amount of injection of sample solution: 0.1 mL
Detector: RI (refractive index)
Polystyrene standard sample: PS-1 and PS-2 (produced by Polymer Laboratories) (molecular weight: 17 types of 7,500,000, 2,560,000, 841, 700, 377, 400, 320, 000, 210, 500, 148,000, 96,000, 59,500, 50,400, 28,500, 20,650, 10,850, 5,460, 2,930, 1,300, and 580)

In the examples described later, the measurement was performed under the above-described condition.

Characteristics of Triblock Polymer

Regarding the ABC triblock polymer used for the ink according to aspects of the present invention, the number average molecular weight (Mn), in terms of polystyrene, obtained by GPC may be 1,000 or more and 30,000 or less, such as 1,000 or more and 10,000 or less, and even 2,000 or more and 10,000 or less. If the number average molecular weight is less than 1,000, the hydrophilicity of the triblock polymer is enhanced and the triblock polymer becomes not adsorbed by the pigment easily, so that, in some cases, the effect of suppressing the bronze phenomenon is not obtained sufficiently. If the number average molecular weight is more than 30,000, the water solubility of the triblock polymer is reduced and, thereby, the glossiness of an image is not obtained sufficiently in some cases and effects of improving the storage stability and the ejection stability of the ink are not obtained sufficiently in some cases.

The molecular weight distribution obtained by GPC of the ABC triblock polymer satisfies preferably 1.0≤(weight average molecular weight in terms of polystyrene: Mw)/(number average molecular weight in terms of polystyrene: Mn)≤2.0. The value of the molecular weight distribution is 1.0 or more in theory. An approach of this value to 1.0 refers to an approach to monodispersion. Meanwhile, if the molecular weight distribution is more than 2.0, high-molecular weight and low-molecular weight ABC triblock polymers are present in a mixed state. Therefore, the glossiness of an image is not obtained sufficiently in some cases and effects of improving the storage stability and the ejection stability of the ink and an effect of suppressing the bronze phenomenon are not obtained sufficiently in some cases.

The acid value of the ABC triblock polymer used for the ink according to aspects of the present invention may be 20 mgKOH/g or more and 250 mgKOH/g or less, and even 20 mgKOH/g or more and 150 mgKOH/g or less. If the acid value is less than 20 mgKOH/g, acid groups are small in number, so that the hydrophilicity of the triblock polymer is low, the glossiness of an image is not obtained sufficiently in some cases, and effects of improving the storage stability and the ejection stability of the ink are not obtained sufficiently in some cases. If the acid value is more than 150 mgKOH/g, acid groups are large in number, the hydrophilicity of the triblock polymer is high and the triblock polymer becomes not adsorbed by the pigment easily, so that the effect of suppressing the bronze phenomenon is not obtained sufficiently in some cases. In this regard, the acid values of the individual blocks of the ABC triblock polymer used for the ink according to aspects of the present invention can satisfy the relationship of (acid value of A block)<(acid value of B block)<(acid value of C block).

Furthermore, the hydrophilicity of the ABC triblock polymer used for the ink according to the present invention can be evaluated on the basis of the ratio (Mn/acid value) of the number average molecular weight (Mn), in terms of polystyrene, obtained by GPC of the ABC triblock polymer to the acid value. According to aspects of the present invention, the value of Mn/acid value may be 50 or more and 200 or less. If the value is less than 50, the hydrophilicity of the triblock polymer is high and the triblock polymer becomes not adsorbed by the pigment easily, so that the effect of suppressing the bronze phenomenon is not obtained sufficiently in some cases. If the value is more than 200, the water solubility of the triblock polymer is low, so that the glossiness of an image is not obtained sufficiently in some cases and effects of improving the storage stability and the ejection stability of the ink are not obtained sufficiently in some cases.

The proportion (percent by mass), relative to a total mass of the ABC triblock polymer, of the A block in the ABC triblock polymer used for the ink according to aspects of the present invention may be 5.0 times or more and 15.0 times or less the proportion (percent by mass) of units derived from all acidic monomers contained in the ABC triblock polymer. If the proportion is less than 5.0 times, the hydrophilicity of the ABC triblock polymer is high and the ABC triblock polymer becomes not adsorbed by the pigment easily, so that the effect of suppressing the bronze phenomenon is not obtained sufficiently in some cases. If the proportion is more than 15.0 times, the water solubility of the ABC triblock polymer is low, so that the glossiness of an image is not obtained sufficiently in some cases and effects of improving the storage stability and the ejection stability of the ink are not obtained sufficiently in some cases.

The content (percent by mass) of the ABC triblock polymer in an ink jet ink may be 0.1 percent by mass or more and 15.0 percent by mass or less relative to a total mass of the ink. Furthermore, the content (percent by mass) of the ABC triblock polymer may be 0.2 times or more and 0.5 times or less the content (percent by mass) of the pigment on a mass ratio basis. If the ratio is less than 0.2 times, the amount of polymer adsorbed by the pigment is small relatively, so that the effect of suppressing the bronze phenomenon is not obtained sufficiently in some cases. If the ratio is more than 0.5 times, the amount of polymer not adsorbed by the pigment is large relatively and, thereby, aggregates are formed among the polymers, so that the glossiness of an image is not obtained sufficiently in some cases and effects of improving the storage stability and the ejection stability of the ink are not obtained sufficiently in some cases.

Pigment

Any inorganic pigment and organic pigment in the related art can be used for the ink according to aspects of the present invention. As for the content of the pigment, 0.1 percent by mass or more and 20.0 percent by mass or less is suitable relative to a total mass of the ink, and 1.0 percent by mass or more and 12.0 percent by mass or less may be provided. Examples of pigments include polymer dispersion type pigments by using polymers as dispersing agents (a polymer-dispersing pigment by using a macromolecular dispersing agent, a microcapsule pigment in which the surfaces of pigment particles are covered with a polymer, and a polymer-attached self-dispersing pigment in which an organic group containing a high molecule is chemically attached to the surfaces of pigment particles) and self dispersion type pigments in which a hydrophilic group is attached to the surfaces of pigment particles (a self-dispersing pigment). As a matter of course, pigments prepared by different dispersing methods can be used in combination. The above-described ABC triblock polymer may be used as a pigment dispersing agent.

Polyurethane Polymer Emulsion

The ink according to aspects of the present invention can further contain a polyurethane polymer emulsion having a unit derived from a polyether polyol. In the present invention, the "polymer emulsion" refers to polymer fine particles present in a state of being dispersed in an aqueous medium.

Usually, in the case where a polyurethane polymer emulsion is contained in an ink, the scratch resistance and the highlighter resistance of an image is improved, although the ejection stability of the ink and the frequency responsibility of the ink are reduced. However, in the case where the above-described ABC triblock polymer used for the ink according to aspects of the present invention and the polyurethane polymer emulsion having a unit derived from a polyether polyol are used in combination, it becomes possible to ensure the compatibility of the ejection stability and the frequency responsibility of the ink with the scratch resistance and the highlighter resistance of the image, even though the compatibility between them is not usually ensured. In this regard, the "frequency responsibility" can be evaluated by observing whether the ink is ejected normally when the frequency (drive frequency) to apply a drive voltage for ejection of an ink from an ink jet method recording head is increased. The above-described effects may be obtained by containing the polyurethane polymer emulsion having a unit derived from a polyether polyol because of the reason as described below in detail.

As described above, the ABC triblock polymer used for the ink according to aspects of the present invention has a structure having a hydrophobic segment and a hydrophilic segment at opposite ends. According to this structure, the ABC triblock polymer can be dispersed in the ink stably because the hydrophobic A block is adsorbed by the surface of the polyurethane polymer emulsion and the high-hydrophilicity C block present at the end opposite to the A block is oriented in the dispersion medium. The hydrophilicity of the polyurethane polymer emulsion is improved through such action, it becomes possible to ensure the compatibility of the ejection stability and the frequency responsibility of the ink with the scratch resistance and the highlighter resistance of the image.

In general, in synthesis of the polyurethane polymer emulsion, a polyester polyol, a polyether polyol, a polycarbonate diol, or the like is used as a long-chain polyol. According to the study by the present inventors, the above-described effect was obtained with respect to the polyurethane polymer emulsion by using the polyether polyol among them. Although the reasons for this are not certain, it is believed that the polyurethane polymer emulsion having a unit derived from the polyether polyol exhibits strong interaction with the above-described ABC triblock polymer used for the ink according to aspects of the present invention. Consequently, the hydrophilicity of the polyurethane polymer emulsion tends to become high. Furthermore, the polyurethane polymer emulsion having a unit derived from the polyether polyol is not hydrolyzed easily and a formed film has high flexibility, so that an image exhibits excellent scratch resistance and highlighter resistance.

On the other hand, the polyurethane polymer emulsion by using only the polyester polyol as the polyol is hydrolyzed easily. Moreover, regarding the polyurethane polymer emulsion by using only the polycarbonate diol, a film becomes hard easily when the film is formed and the fastness property is not sufficient in some cases. In addition, the polyurethane polymer emulsion by using the polyester polyol or polycarbonate diol has weak interaction with the above-described ABC triblock polymer used for the ink according to aspects of the present invention and, therefore, the hydrophilicity of the polyurethane polymer is not improved. As described above, regarding the ink containing the polyurethane polymer emulsion by using only the polyester polyol or polycarbonate diol as the polyol and the above-described ABC triblock polymer used for the ink according to aspects of the present invention, it is not possible to ensure the compatibility of the ejection stability and the frequency responsibility of the ink with the scratch resistance and the highlighter resistance of the image.

The polyurethane polymer emulsion which has a unit derived from the polyether polyol and which is used for the ink according to aspects of the present invention can further have units derived from a polyisocyanate, a polyether polyol, a diol having an acidic group, and a chain extension agent. Each of components constituting the polyurethane polymer emulsion having a unit derived from the polyether polyol will be described below.

Polyether Polyol

The polyether polyol used in synthesis of a polyurethane polymer suitable for the ink according to aspects of the present invention is a long-chain polyether polyol having the carbon number of 10 or more. Examples of polyether polyols used according to aspects of the present invention include addition polymers of alkylene oxide and polyalkylene glycol or polyhydric alcohols having at least divalence. Examples of the above-described alkylene oxides include ethylene oxide, propylene oxide, butylene oxide, and alpha-olefin oxide. Examples of the above-described polyalkylene glycols include polyethylene glycol, polypropylene glycol, polytetramethylene glycol, and ethylene glycol-propylene glycol copolymers. Examples of the above-described dihydric alcohols include hexamethylene glycol, tetramethylene glycol, ethylene glycol, diethylene glycol, propylene glycol, dipropylene glycol, 1,3-butane diol, 1,4-butane diol, 4,4'-dihydroxyphenylpropane, and 4,4'-dihydroxyphenylmethane. Examples of polyhydric alcohols having at least trivalence include glycerin, trimethylolpropane, 1,2,5-hexane triol, 1,2,6-hexane triol, and pentaerithritol. At least one type of these polyether polyols may be used. Among the polyether polyols, in particular, polypropylene glycol can be used. According to the study by the present inventors, it was ascertained that the water solubility of the polyurethane polymer was improved and the ejection stability and the frequency responsibility of the ink were further improved by using the polypropylene glycol.

As described above, as for the polyol used in synthesis of the polyurethane polymer, polyester polyols and polycarbonate diols are mentioned besides the polyether polyols. In the case where other polyols, e.g., polyester polyols and polycarbonate diols, are used in combination with the polyether polyol, the proportions (percent by mass) of the polyether polyol may be 90.0 percent by mass or more relative to a total mass of the polyol components employed. In particular, the polyol can be only the polyether polyol, that is, the above-described proportion (percent by mass) of the polyether polyol is preferably 100.0%. This is because if at least two types of polyols are used in combination, control of synthesis of the polyurethane polymer may become difficult from the viewpoint of the reactivity in general.

The number average molecular weight, in terms of polystyrene, obtained by GPC of the above-described polyether polyol may be 400 or more and 4,000 or less. If the number average molecular weight is less than 400, the flexibility of the film is reduced and effects of improving the scratch resistance and the highlighter resistance of the image are not obtained in some cases. If the number average molecular weight is more than 4,000, the flexibility of the film becomes too high and the effects of improving the scratch resistance and the highlighter resistance of the image are not obtained in some cases. The carbon number of the polyether polyol used in the present invention may be 10 or more and 250 or less.

Polyisocyanate

According to aspects of the present invention, the "polyisocyanate" refers to a compound having at least two isocyanate groups. Specific examples of polyisocyanates usable according to aspects of the present invention include aliphatic polyisocyanates, alicyclic polyisocyanates, aromatic polyisocyanates, and araliphatic polyisocyanates.

Examples of aliphatic polyisocyanates include tetramethylene diisocyanate, dodecamethylene diisocyanate, hexamethylene diisocyanate, 2,2,4-trimethylhexamethylene diisocyanate, 2,4,4-trimethylhexamethylene diisocyanate, lysine diisocyanate, 2-methylpentane-1,5-diisocyanate, and 3-methylpentane-1,5-diisocyanate. Examples of alicyclic polyisocyanates include isophorone diisocyanate, hydrogenated xylylene diisocyanate, 4,4'-dicyclohexylmethane diisocyanate, 1,4-cyclohexane diisocyanate, methylcyclohexylene diisocyanate, and 1,3-bis(isocyanate methyl)cyclohexane. Examples of aromatic polyisocyanates include tolylene diisocyanate, 2,2'-diphenylmethane diisocyanate, 2,4'-diphenylmethane diisocyanate, 4,4'-diphenylmethane diisocyanate, 4,4'-dibenzyl diisocyanate, 1,5-naphthylene diisocyanate, xylylene diisocyanate, 1,3-phenylene diisocyanate, and 1,4-phenylene diisocyanate. Examples of araliphatic polyisocyanates include dialkyldiphenylmethane diisocyanate, tetraalkyldiphenylmethane diisocyanate, and alpha,alpha,alpha,alpha-tetramethylxylylene diisocyanate. At least one type of these polyisocyanates is used, as necessary. According to aspects of the present invention, in particular, the alicyclic polyisocyanates can be used among the above-described polyisocyanates. Furthermore, among the alicyclic polyisocyanates, isophorone diisocyanate can be used.

Diol Having Acid Group

According to aspects of the present invention, the "diol having acid group" refers to a short-chain diol having an acid group, e.g., a carboxyl group, a sulfonic acid group, or a phosphoric acid group, in the molecule and having the carbon number of less than 10. Examples of diols which are usable in synthesis of the polyurethane polymer used for the ink according to aspects of the present invention and which have an acidic group include dimethylol acetic acid, dimethylol propionic acid, and dimethylol butanoic acid. In particular, at least one of dimethylol propionic acid and dimethylol butanoic acid can be used.

Chain Extension Agent

The chain extension agent is a compound to react with remaining isocyanate groups, which have not formed an urethane bond, among polyisocyanate units in an urethane prepolymer. Examples of chain extension agents usable in synthesis of the polyurethane polymer used for the ink according to aspects of the present invention include trimethylolmelamine and derivatives thereof, dimethylolurea and derivatives thereof, polyvalent amine compounds, e.g., dimethylol ethylamine, diethanol methylamine, dipropanol ethylamine, dibutanol methylamine, ethylenediamine, propylenediamine, diethylenetriamine, hexylenediamine, triethylenetetramine, tetraethylenepentamine, isophoronediamine, xylylenediamine, diphenylmethanediamine, hydrogenated diphenylmethanediamine, and hydrazine, polyamide polyamine, and polyethylene polyimine. At least one type of these chain extension agents is used, as necessary.

Characteristics of Polyurethane Polymer Emulsion

The acid value of the polyurethane polymer emulsion usable for the ink according to aspects of the present invention is controlled by the proportion of units derived from diol having an acid group and may be 20 mgKOH/g or more and 100 mgKOH/g or less. If the acid value is less than 20 mgKOH/g, the hydrophilicity of the polyurethane polymer is low and the dispersion stability of the polymer emulsion is low, so that effects of improving the ejection stability and the frequency responsibility are not obtained sufficiently in some cases. If the acid value is more than 100 mgKOH/g, the hydrophilicity of the polyurethane polymer is high and the flexibility of the film is enhanced, so that effects of improving the scratch resistance and the highlighter resistance are not obtained sufficiently in some cases.

Regarding the molecular weight of the polyurethane polymer emulsion usable for the ink according to aspects of the present invention, the weight average molecular weight (Mw), in terms of polystyrene, obtained by GPC may be 5,000 or more and 50,000 or less.

According to aspects of the present invention, the content (percent by mass) of the polyurethane polymer emulsion in the ink may be less than 2.0 percent by mass relative to a total mass of the ink, and even 0.1 percent by mass or more and less than 2.0 percent by mass. If the content is less than 0.1 percent by mass, the effects of improving the scratch resistance and the highlighter resistance of the image are not obtained sufficiently in some cases. If the content is more than 2.0 percent by mass, the effects of improving the ejection stability and the frequency responsibility of the ink are not obtained sufficiently in some cases.

The content (percent by mass) of the polyurethane polymer emulsion relative to a total mass of the ink may be 0.10 times or more and 0.70 times or less the content (percent by mass) of the pigment on a mass ratio basis. If the ratio is less than 0.10 times, the effects of improving the scratch resistance and the highlighter resistance of the image are not obtained sufficiently in some cases. If the ratio is more than 0.70 times, the effects of improving the ejection stability and the frequency responsibility of the ink are not obtained sufficiently in some cases.

The content (percent by mass) of the polyurethane polymer emulsion relative to a total mass of the ink may be 0.30 times or more and less than 1.00 time of the content (percent by mass) of the ABC triblock polymer on a mass ratio basis. If the ratio is less than 0.30 times, the effects of improving the scratch resistance of the image, the highlighter resistance of the image, and the frequency responsibility of the ink are not obtained sufficiently in some cases. If the content is 1.00 time or more, the effects of improving the ejection stability and the frequency responsibility of the ink are not obtained sufficiently in some cases.

Method for Synthesizing Polyurethane Polymer Emulsion

As for the method for synthesizing the polyurethane polymer emulsion usable for the ink according to aspects of the present invention, any method generally used in the related art, e.g., a one-shot method and a multistage method, may be used, although the following method can be employed. Initially, a polyether polyol is agitated in an organic solvent, e.g., methyl ethyl ketone, sufficiently so as to be dissolved and, thereafter, a polyisocyanate and a diol having an acid group is added and reacted, so that an urethane prepolymer solution is obtained. Subsequently, the resulting urethane prepolymer solution is neutralized. Then, ion-exchanged water is added, and emulsification is performed by agitating with a homomixer at a high speed. After the emulsification, a chain extension agent is added so as to effect a chain extension reaction.

Method for Analyzing Polyurethane Polymer Emulsion

The composition, the molecular weight, and the acid value of the polyurethane polymer emulsion usable for the ink according to aspects of the present invention may be analyzed by a method in the related art. That is, it is possible to ascertain by subjecting the ink to centrifugal separation and examining the resulting sediments and a supernatant fluid. The pigment is insoluble into organic solvents and, therefore, the polyurethane polymer emulsion may also be separated through solvent extraction. Although it is possible to ascertain individually in the state of ink, higher accuracy is ensured through extraction of the polyurethane polymer emulsion. As for a specific method, the ink is subjected to centrifugal separation at 80,000 rpm, the resulting supernatant fluid is measured with a Fourier transform infrared spectrophotometer (FT-IR) and, thereby, the types of polyisocyanate and polyether polyol can be identified on the basis of an absorption wavelength intrinsic to an urethane bond. Furthermore, the supernatant fluid is subjected to acid precipitation with hydrochloric acid or the like. Then, dried product of acid precipitation is dissolved into chloroform or the like and is measured by a nuclear magnetic resonance method (NMR), so that the molecular weight of the polyol can be quantified. The acid value of the polyurethane polymer emulsion can be measured by a titration method. In examples described later, the polymer is dissolved into tetrahydrofuran (THF) and the acid value can be measured through potentiometric titration by using Automatic Potentiometric Titrator AT510 (produced by Kyoto Electronics Manufacturing Co., Ltd.) with a potassium hydroxide ethanol titrant. The weight average molecular weight and the number average molecular weight of the polyurethane polymer emulsion are obtained by GPC.

Aqueous Medium

The ink according to aspects of the present invention may contain an aqueous medium which is a mixed solvent of water and a water-soluble organic solvent. As for the water, ion-exchanged water (deionized water) can be used. Examples of water-soluble organic solvents include alkyl alcohols having the carbon number of 1 to 4, amides, polyalkylene glycols, glycols, alkylene glycols in which an alkylene group has the carbon number of 2 to 6, polyhydric alcohols, alkyl ethers of polyhydric alcohols, and nitrogen-containing compounds. These water-soluble organic solvents may be used alone or in combination. The content (percent by mass) of the water in the ink may be 10.0 percent by mass or more and 90.0 percent by mass or less, and such as 30.0 percent by mass or more and 80.0 percent by mass or less relative to a total mass of the ink. The content (percent by mass) of the water-soluble organic solvent in the ink may be 3.0 percent by mass or more and 50.0 percent by mass or less, and such as 3.0 percent by mass or more and 40.0 percent by mass or less relative to a total mass of the ink.

Other Components

The ink according to aspects of the present invention may contain various additives, e.g., a surfactant, a pH regulator, a rust inhibitor, an antiseptic, a fungicide, an antioxidant, a reduction inhibitor, a vaporization promoter, a chelating agent, and polymers other than the above-described ABC triblock polymer and the above-described polyurethane polymer emulsion, besides the above-described components, as necessary. The content (percent by mass) of such additives in the ink may be 0.05 percent by mass or more and 10.0 percent by mass or less, such as 0.2 percent by mass or more and 5.0 percent by mass or less relative to a total mass of the ink.

The pH of the ink according to aspects of the present invention may be specified to be 7 or more and 10 or less, and the pH may be adjusted by using the pH regulator. The pH of the ink is a value at 25° C. and may be measured by using a common pH meter.

Method for Preparing Ink

Any method generally used in the related art may be used as the method for preparing the ink according to aspects of the present invention composed of the above-described components. Specifically, the ABC triblock polymer is mixed into an aqueous medium and agitation is performed to obtain a polymer solution. The resulting polymer solution and the pigment dispersion, the aqueous medium, and the above-described other additives, which are prepared separately, are mixed, so that the ink according to aspects of the present invention is obtained.

In preparation of the polymer solution, heating may be performed to facilitate dissolution of the polymer and association among polymers. Alternatively, the ABC triblock polymer may be dissolved into an organic solvent, e.g., tetrahydrofuran, and thereafter, a polymer solution may be obtained by adding and mixing the above-described aqueous medium and other components, as necessary, and removing the organic solvent with a separating funnel, an evaporator, or the like.

In the case where the ABC triblock polymer is used as a dispersing agent of the pigment, for example, the pigment is added to the polymer solution prepared by the above-described method, mixing and agitation are performed and, thereafter, a dispersing treatment is performed, so as to obtain a pigment dispersion. The ink according to aspects of the present invention may be produced by further mixing the aqueous medium and the above-described other components. In preparation of the pigment dispersion by using the ABC triblock polymer as a dispersing agent, the dispersion stability of the ink is more improved by adding a base in order to dissolve the polymer. Examples of bases used at this time include organic amines, e.g., monoethanol amine, diethanol amine, triethanol amine, amine methyl propanol, and ammonia, and inorganic bases, e.g., potassium hydroxide, sodium hydroxide, and lithium hydroxide.

Set of Ink and Reaction Liquid

The ink according to aspects of the present invention can be used as a set in combination with a reaction liquid to aggregate the ABC triblock polymer. This is because a film of the ABC triblock polymer becomes strong through aggregation of the ABC triblock polymer and, thereby, the scratch resistance is improved. As for the reactant contained in the reaction liquid, polyvalent metal ions, acidic compounds, cationic compounds, and the like are mentioned. No such reactants can be contained in the ink according to aspects of the present invention.

Ink Cartridge

The ink cartridge according to aspects of the present invention includes an ink storage portion to store an ink, wherein the above-described ink according to aspects of the present invention is stored in the above-described ink storage portion. As for the structure of the ink cartridge, a structure in which the ink storage portion is formed from an ink containing chamber to store the liquid ink and a negative pressure generation member-holding chamber to store a negative pressure generating member to hold the ink in the inside thereof through the use of a negative pressure is mentioned. Alternatively, the ink cartridge may be an ink storage portion which does not have the ink containing chamber to store the liquid ink, but which is configured to hold the whole amount of ink to be stored by the negative pressure generating member. Furthermore, a form in which the ink cartridge is configured to have the ink storage portion and a recording head may be employed.

Ink Jet Recording Method

An ink jet recording method according to aspects of the present invention is the ink jet recording method to perform recording on a recording medium by ejecting an ink from an ejection orifice of an ink jet method recording head in accordance with recording signals, and the above-described ink according to aspects of the present invention is used. Regarding aspects of the present invention, in particular, the ink jet recoding method employing the system in which thermal energy is applied to the ink so as to eject the ink from the ejection orifice of the recording head can be used. According to aspects of the present invention, the term "recording" includes the form in which recording is performed on normal paper or a recording medium having an ink receiving layer by using the ink according to aspects of the present invention, and a form in which printing is performed on a base member, e.g., glass, plastic, and film, not having a liquid absorption property by using the ink according to aspects of the present invention.

EXAMPLES

Aspects of the present invention will be described below in further detail with reference to examples and comparative examples. However, the present invention is not limited to the following examples within the bounds of not departing from the gist thereof. By the way, in the following description of the examples, the term "part" is on a mass basis, unless otherwise specified. Abbreviations are as described below.

AA: acrylic acid
MAA: methacrylic acid
MMA: methyl methacrylate
nBA: n-butyl acrylate
nBMA: n-butyl methacrylate
tBMA: tert-butyl methacrylate
HEMA: 2-hydroxyethyl methacrylate
HEA: 2-hydroxyethyl acrylate
St: styrene
BzMA: 2-benzyl methacrylate
PEMA: 2-phenylethyl methacrylate
SMA: stearyl methacrylate
MTEGMA: methoxytriethylene glycol methacrylate
ETEGMA: ethoxytriethylene glycol methacrylate
IPDI: isophorone diisocyanate
TDI: tolylene diisocyanate
PPG: polypropylene glycol
PTMG: polytetramethylene glycol
PEG: polyethylene glycol
DMPA: dimethylol propionic acid
EDA: ethylenediamine
CuCl: copper(I) chloride
Bpy: bipyridine
MCP: methyl 1,2-chloropropionate
DMF: dimethylformamide
PMDTA: pentamethyldiethylenetriamine
TMSMA: trimethylsilyl methacrylate Preparation of Polymer Aqueous Solution Preparation of Polymer Aqueous Solutions 1 to 73 and 78 to 83

Polymer aqueous solutions 1 to 73 and 78 to 83 were prepared by using the following Polymerization method I or Polymerization method II with charges described in Table 1 and Table 2.

Polymerization Method I

In a nitrogen atmosphere at a polymerization temperature T (° C.), a n-butyl lithium (n-BuLi) solution was added to 160 g of tetrahydrofuran (THF) including 0.47 g of lithium. Subsequently, Monomer x was added and agitation was performed for 40 minutes. Thereafter, 3.08 g of diethyl zinc solution was added and agitation was performed for 1 minute to obtain a polymerization solution of Monomer x. Monomer y solution prepared by adding Monomer y to 11 g of THF and adding 4.53 g of diethyl zinc solution in four batches was dropped on the polymerization solution of Monomer x over 6 minutes. After dropping was finished, agitation was performed for 60 minutes to obtain an XY diblock polymer aqueous solution. Furthermore, Monomer z solution prepared by adding Monomer z to 11 g of THF and adding 4.53 g of diethyl zinc solution in four batches was dropped on the XY diblock polymer aqueous solution over 6 minutes. After dropping was finished, agitation was performed for 60 minutes, and 1.3 g of acetic acid was added to terminate the reaction. A XYZ triblock polymer was obtained by adding 2.8 g of 35.0% hydrochloric acid aqueous solution to the resulting solution, performing agitation at room temperature for 10 minutes, and performing washing three times with pure water, followed by drying.

The number average molecular weight of the resulting XYZ triblock polymer was measured with GPC provided with a differential refractometer (produced by Tosoh Corporation) by using polystyrene as a standard substance and THF as a solvent. In the case where tBMA was used as a monomer, it was ascertained that tBMA was hydrolyzed because a peak was present at a chemical shift value δ: 12 to 13 of a carboxyl group of MAA on the basis of proton nuclear magnetic resonance ($^1$H-NMR) spectroscopy. In addition, constituent ratios of monomers constituting each block were analyzed on the basis of the $^1$H-NMR measurement. As for the acid value, the XYZ triblock polymer was dissolved into THF, and the acid value was measured with Automatic Potentiometric Titrator AT510 (produced by Kyoto Electronics Manufacturing Co., Ltd.) by using a 0.5 mol/L potassium hydroxide ethanol solution as a titrant.

The resulting XYZ triblock polymer was dissolved into THF, a potassium hydroxide aqueous solution in an amount 0.8 times the amount equivalent, on a mole basis, to the acid value of the polymer and an appropriate amount of water were added, and agitation was performed. Thereafter, THF was removed under the condition of reduced pressure, and water was added, so as to obtain 25.0 percent by mass polymer aqueous solution.

Polymerization Method II

In a glove box subjected to nitrogen substitution, Monomer x and (1-methyltellanyl-ethyl)benzene (MTEBz) were reacted at a polymerization temperature T (° C.) for 30 hours. After the reaction was finished, Monomer y was added successively, and a reaction was effected at a polymerization temperature T (° C.) for 30 hours. After the reaction was finished, Monomer z was added, and a reaction was effected at a polymerization temperature T (° C.) for 30 hours. After the reaction was finished, the reaction solution was dissolved into 5 mL of chloroform, and the resulting solution was poured into agitated 300 mL of water/methanol mixed solution (water:methanol=1:4). A precipitated polymer was suction-filtrated and dried, so as to obtain an XYZ triblock polymer.

The molecular weight of the resulting XYZ triblock polymer was measured with GPC provided with a differential refractometer (produced by Tosoh Corporation) by using polystyrene as a standard substance and THF as a solvent. In addition, constituent ratios of monomers constituting each block were analyzed on the basis of the $^1$H-NMR spectroscopy. As for the acid value, the XYZ triblock polymer was dissolved into THF, and the acid value was measured with Automatic Potentiometric Titrator AT510 (produced by Kyoto Electronics Manufacturing Co., Ltd.) by using a 0.5 mol/L potassium hydroxide ethanol solution as a titrant.

A potassium hydroxide aqueous solution in an amount equivalent, on a mole basis, to the acid value of the polymer and an appropriate amount of water were added to the resulting XYZ triblock polymer solution, and agitation was performed. Thereafter, the polymerization solvent was removed under the condition of reduced pressure, and water was added, so as to obtain 25.0 percent by mass polymer aqueous solution.

TABLE 1

Preparation condition of Polymer aqueous solution

| Polymer aqueous solution No. | Polymerization method | Polymerization temperature T (° C.) | nBuLi (g) | MTEBz (mg) | Monomer x Type | Usage (g) | (part) | Monomer y Type | Usage (g) | (part) | Monomer z Type | Usage (g) | (part) |
|---|---|---|---|---|---|---|---|---|---|---|---|---|---|
| 1 | I | −50 | 3.080 | — | BzMA | 6.700 | 67.0 | HEMA | 2.300 | 23.0 | tBMA | 1.000 | 10.0 |
| 2 | II | 60 | — | 6.2 | St | 0.480 | 48.0 | HEMA | 0.491 | 49.1 | MAA | 0.029 | 2.9 |
| 3 | | 60 | — | 6.2 | St | 0.480 | 48.0 | HEMA | 0.489 | 48.9 | MAA | 0.031 | 3.1 |
| 4 | | 60 | — | 6.2 | St | 0.300 | 30.0 | HEMA | 0.639 | 63.9 | MAA | 0.061 | 6.1 |
| 5 | | 60 | — | 6.2 | St | 0.300 | 30.0 | HEMA | 0.562 | 56.2 | MAA | 0.138 | 13.8 |
| 6 | | 60 | — | 6.2 | St | 0.300 | 30.0 | HEMA | 0.470 | 47.0 | MAA | 0.230 | 23.0 |
| 7 | | 60 | — | 6.2 | St | 0.300 | 30.0 | HEMA | 0.469 | 46.9 | MAA | 0.231 | 23.1 |
| 8 | I | 10 | 3.080 | — | BzMA | 0.190 | 16.5 | HEMA | 0.580 | 50.4 | tBMA | 0.380 | 33.0 |
| 9 | | 10 | 3.080 | — | BzMA | 0.200 | 17.4 | HEMA | 0.570 | 49.6 | tBMA | 0.380 | 33.0 |
| 10 | | 10 | 3.080 | — | BzMA | 0.400 | 34.8 | HEMA | 0.370 | 32.2 | tBMA | 0.380 | 33.0 |
| 11 | | 10 | 3.080 | — | BzMA | 0.600 | 52.2 | HEMA | 0.169 | 14.7 | tBMA | 0.380 | 33.1 |
| 12 | | 10 | 3.080 | — | BzMA | 0.800 | 78.5 | HEMA | 0.171 | 16.8 | tBMA | 0.048 | 4.7 |
| 13 | | 10 | 3.080 | — | BzMA | 0.810 | 79.5 | HEMA | 0.161 | 15.8 | tBMA | 0.048 | 4.7 |
| 14 | I | 10 | 7.000 | — | BzMA | 0.810 | 79.5 | HEMA | 0.161 | 15.8 | tBMA | 0.048 | 4.7 |
| 15 | | 10 | 6.900 | — | BzMA | 0.810 | 79.5 | HEMA | 0.161 | 15.8 | tBMA | 0.048 | 4.7 |
| 16 | | 10 | 1.730 | — | BzMA | 0.810 | 79.5 | HEMA | 0.161 | 15.8 | tBMA | 0.048 | 4.7 |
| 17 | | 10 | 0.690 | — | BzMA | 0.810 | 79.5 | HEMA | 0.161 | 15.8 | tBMA | 0.048 | 4.7 |
| 18 | | 10 | 0.231 | — | BzMA | 0.810 | 79.5 | HEMA | 0.161 | 15.8 | tBMA | 0.048 | 4.7 |
| 19 | | 10 | 0.230 | — | BzMA | 0.810 | 79.5 | HEMA | 0.161 | 15.8 | tBMA | 0.048 | 4.7 |
| 20 | I | −60 | 0.223 | — | BzMA | 0.810 | 79.5 | HEMA | 0.161 | 15.8 | tBMA | 0.048 | 4.7 |
| 21 | | −50 | 0.223 | — | BzMA | 0.810 | 79.5 | HEMA | 0.161 | 15.8 | tBMA | 0.048 | 4.7 |
| 22 | | −35 | 0.223 | — | BzMA | 0.810 | 79.5 | HEMA | 0.161 | 15.8 | tBMA | 0.048 | 4.7 |
| 23 | | −20 | 0.223 | — | BzMA | 0.810 | 79.5 | HEMA | 0.161 | 15.8 | tBMA | 0.048 | 4.7 |
| 24 | | 0 | 0.223 | — | BzMA | 0.810 | 79.5 | HEMA | 0.161 | 15.8 | tBMA | 0.048 | 4.7 |
| 25 | | 10 | 0.223 | — | BzMA | 0.810 | 79.5 | HEMA | 0.161 | 15.8 | tBMA | 0.048 | 4.7 |
| 26 | II | 60 | — | 8.2 | St | 0.143 | 14.3 | HEMA | 0.828 | 82.8 | MAA | 0.029 | 2.9 |
| 27 | | 60 | — | 8.2 | St | 0.146 | 14.6 | HEMA | 0.825 | 82.5 | MAA | 0.029 | 2.9 |
| 28 | | 60 | — | 8.2 | St | 0.204 | 20.4 | HEMA | 0.767 | 76.7 | MAA | 0.029 | 2.9 |
| 29 | | 60 | — | 8.2 | St | 0.291 | 29.1 | HEMA | 0.680 | 68.0 | MAA | 0.029 | 2.9 |
| 30 | | 60 | — | 8.2 | St | 0.435 | 43.5 | HEMA | 0.536 | 53.6 | MAA | 0.029 | 2.9 |
| 31 | | 60 | — | 8.2 | St | 0.437 | 43.7 | HEMA | 0.534 | 53.4 | MAA | 0.029 | 2.9 |
| 32 | I | 10 | 3.080 | — | BzMA | 0.810 | 79.5 | MMA | 0.161 | 15.8 | tBMA | 0.048 | 4.7 |
| 33 | | 10 | 3.080 | — | BzMA | 0.810 | 79.5 | MMA | 0.161 | 15.8 | tBMA | 0.048 | 4.7 |
| 34 | | 10 | 3.080 | — | BzMA | 0.810 | 79.9 | MMA | 0.169 | 16.7 | tBMA | 0.035 | 3.5 |
| 35 | | 10 | 3.080 | — | BzMA | 0.810 | 80.3 | MMA | 0.176 | 17.4 | tBMA | 0.023 | 2.3 |
| 36 | | 10 | 3.080 | — | BzMA | 0.810 | 80.7 | MMA | 0.182 | 18.1 | tBMA | 0.012 | 1.2 |
| 37 | | 10 | 3.080 | — | BzMA | 0.810 | 80.7 | MMA | 0.182 | 18.1 | tBMA | 0.012 | 1.2 |
| 38 | I | −60 | 3.530 | — | BzMA | 0.700 | 67.4 | MMA | 0.239 | 23.0 | tBMA | 0.100 | 9.6 |
| 39 | | −60 | 3.460 | — | BzMA | 0.700 | 67.4 | MMA | 0.239 | 23.0 | tBMA | 0.100 | 9.6 |
| 40 | | −60 | 2.470 | — | BzMA | 0.700 | 67.4 | MMA | 0.239 | 23.0 | tBMA | 0.100 | 9.6 |
| 41 | | −60 | 1.730 | — | BzMA | 0.700 | 67.4 | MMA | 0.239 | 23.0 | tBMA | 0.100 | 9.6 |
| 42 | | −60 | 0.870 | — | BzMA | 0.700 | 67.4 | MMA | 0.239 | 23.0 | tBMA | 0.100 | 9.6 |
| 43 | | −60 | 0.860 | — | BzMA | 0.700 | 67.4 | MMA | 0.239 | 23.0 | tBMA | 0.100 | 9.6 |

TABLE 2

Preparation condition of Polymer aqueous solution

| Polymer aqueous solution No. | Polymerization method | Polymerization temperature T (°C.) | nBuLi (g) | MTEBz (mg) | Monomer x Type | Usage (g) | (part) | Monomer y Type | Usage (g) | (part) | Monomer z Type | Usage (g) | (part) |
|---|---|---|---|---|---|---|---|---|---|---|---|---|---|
| 44 | II | 100 | — | 50.0 | St | 0.214 | 21.4 | HEA | 0.743 | 74.3 | AA | 0.044 | 4.4 |
| 45 |  | 100 | — | 50.0 | St | 0.218 | 21.8 | HEA | 0.738 | 73.8 | AA | 0.044 | 4.4 |
| 46 |  | 100 | — | 50.0 | St | 0.306 | 30.6 | HEA | 0.651 | 65.1 | AA | 0.044 | 4.4 |
| 47 |  | 100 | — | 50.0 | St | 0.436 | 43.6 | HEA | 0.520 | 52.0 | AA | 0.044 | 4.4 |
| 48 |  | 100 | — | 50.0 | St | 0.658 | 65.8 | HEA | 0.298 | 29.8 | AA | 0.044 | 4.4 |
| 49 |  | 100 | — | 50.0 | St | 0.664 | 66.4 | HEA | 0.292 | 29.2 | AA | 0.044 | 4.4 |
| 50 | I | −60 | 1.780 | — | BzMA | 0.700 | 66.7 | HEMA | 0.223 | 21.3 | tBMA | 0.126 | 12.0 |
| 51 |  | −50 | 1.780 | — | BzMA | 0.700 | 66.7 | HEMA | 0.223 | 21.3 | tBMA | 0.126 | 12.0 |
| 52 |  | −35 | 1.780 | — | BzMA | 0.700 | 66.7 | HEMA | 0.223 | 21.3 | tBMA | 0.126 | 12.0 |
| 53 |  | −20 | 1.780 | — | BzMA | 0.700 | 66.7 | HEMA | 0.223 | 21.3 | tBMA | 0.126 | 12.0 |
| 54 |  | 0 | 1.780 | — | BzMA | 0.700 | 66.7 | HEMA | 0.223 | 21.3 | tBMA | 0.126 | 12.0 |
| 55 |  | 10 | 1.780 | — | BzMA | 0.700 | 66.7 | HEMA | 0.223 | 21.3 | tBMA | 0.126 | 12.0 |
| 56 | I | −50 | 7.000 | — | BzMA | 0.450 | 44.1 | HEMA | 0.519 | 50.9 | tBMA | 0.051 | 5.0 |
| 57 |  | −50 | 6.900 | — | BzMA | 0.450 | 44.1 | HEMA | 0.519 | 50.9 | tBMA | 0.051 | 5.0 |
| 58 |  | −50 | 1.730 | — | BzMA | 0.700 | 64.8 | HEMA | 0.180 | 16.7 | tBMA | 0.200 | 18.5 |
| 59 |  | −50 | 0.690 | — | BzMA | 0.800 | 71.7 | HEMA | 0.016 | 1.4 | tBMA | 0.300 | 26.9 |
| 60 |  | −50 | 0.231 | — | BzMA | 0.700 | 60.9 | HEMA | 0.070 | 6.1 | tBMA | 0.380 | 33.0 |
| 61 |  | −50 | 0.230 | — | BzMA | 0.700 | 60.9 | HEMA | 0.070 | 6.1 | tBMA | 0.380 | 33.0 |
| 62 | I | −50 | 1.730 | — | BzMA | 0.190 | 18.6 | HEMA | 0.770 | 75.3 | tBMA | 0.063 | 6.2 |
| 63 |  | −50 | 1.730 | — | BzMA | 0.200 | 19.6 | HEMA | 0.760 | 74.3 | tBMA | 0.063 | 6.2 |
| 64 |  | −50 | 1.730 | — | BzMA | 0.400 | 38.2 | HEMA | 0.520 | 49.7 | tBMA | 0.127 | 12.1 |
| 65 |  | −50 | 1.730 | — | BzMA | 0.600 | 56.2 | HEMA | 0.290 | 27.2 | tBMA | 0.177 | 16.6 |
| 66 |  | −50 | 1.730 | — | BzMA | 0.800 | 74.8 | HEMA | 0.093 | 8.7 | tBMA | 0.177 | 16.5 |
| 67 |  | −50 | 1.730 | — | BzMA | 0.810 | 75.7 | HEMA | 0.083 | 7.8 | tBMA | 0.177 | 16.5 |
| 68 | II | 100 | — | 80.0 | St | 0.300 | 30.0 | HEMA | 0.671 | 67.1 | MAA | 0.029 | 2.9 |
| 69 |  | 100 | — | 80.0 | St | 0.300 | 30.0 | HEMA | 0.669 | 66.9 | MAA | 0.031 | 3.1 |
| 70 |  | 100 | — | 80.0 | St | 0.350 | 35.0 | HEMA | 0.589 | 58.9 | MAA | 0.061 | 6.1 |
| 71 |  | 100 | — | 40.0 | St | 0.700 | 70.0 | HEMA | 0.162 | 16.2 | MAA | 0.138 | 13.8 |
| 72 |  | 100 | — | 25.0 | St | 0.650 | 65.0 | HEMA | 0.120 | 12.0 | MAA | 0.230 | 23.0 |
| 73 |  | 100 | — | 25.0 | St | 0.650 | 65.0 | HEMA | 0.119 | 11.9 | MAA | 0.231 | 23.1 |
| 78 | I | −50 | 1.730 | — | HEMA | 0.238 | 22.9 | BzMA | 0.700 | 67.3 | tBMA | 0.102 | 9.8 |
| 79 |  | −50 | 1.730 | — | BzMA | 0.700 | 67.3 | tBMA | 0.102 | 9.8 | HEMA | 0.238 | 22.9 |
| 80 |  | −50 | 1.730 | — | SMA | 0.200 | 20.0 | nBMA | 0.400 | 40.0 | MTEGMA | 0.400 | 40.0 |
| 81 |  | −50 | 1.730 | — | BzMA | 0.700 | 67.3 | MTEGMA | 0.238 | 22.9 | tBMA | 0.102 | 9.8 |
| 82 |  | −50 | 1.730 | — | MTEGMA | 0 700 | 67.3 | HEMA | 0.238 | 22.9 | tBMA | 0.102 | 9.8 |
| 83 |  | −50 | 1.730 | — | BzMA | 0.700 | 70.0 | HEMA | 0.238 | 23.8 | MTEGMA | 0.062 | 6.2 |

Preparation of Polymer Aqueous Solution 74

In a nitrogen atmosphere at −50° C., 1.73 g of n-BuLi solution was added to 160 g of THF including 0.47 g of lithium. Subsequently, 0.70 g of BzMA, 0.24 g of HEMA, and 0.10 g of tBMA were added and agitation was performed for 40 minutes. Thereafter, 3.08 g of diethyl zinc solution was added and agitation was performed for 1 minute. Furthermore, 1.3 g of acetic acid was added to terminate the reaction. A random polymer was obtained by adding 2.8 g of 35.0% hydrochloric acid aqueous solution to the resulting solution, performing agitation at room temperature for 10 minutes, and performing washing three times with pure water, followed by drying.

The molecular weight of the resulting random polymer was measured with GPC provided with a differential refractometer (produced by Tosoh Corporation) by using polystyrene as a standard substance and THF as a solvent. It was ascertained that tBMA was hydrolyzed because a peak was present at a chemical shift value δ: 12 to 13 of a carboxyl group of MAA on the basis of the proton nuclear magnetic resonance ($^1$H-NMR) spectroscopy. In addition, constituent ratios of monomers were analyzed on the basis of the $^1$H-NMR measurement. As for the acid value, the random polymer was dissolved into THF, and the acid value was measured with Automatic Potentiometric Titrator AT510 (produced by Kyoto Electronics Manufacturing Co., Ltd.) by using a 0.5 mol/L potassium hydroxide ethanol solution as a titrant.

The resulting random polymer was dissolved into THF, a potassium hydroxide aqueous solution in an amount 0.8 times the amount equivalent, on a mole basis, to the acid value of the polymer and an appropriate amount of water were added, and agitation was performed. Thereafter, THF was removed under the condition of reduced pressure, and water was added, so as to obtain 25.0 percent by mass Polymer aqueous solution 74.

Preparation of Polymer Aqueous Solutions 75 to 77

Polymer aqueous solutions 75 to 77 were prepared by using the following polymerization method with charges described in Table 3. In a nitrogen atmosphere at −50° C., 1.73 g of n-BuLi solution was added to 160 g of THF including 0.47 g of lithium. Subsequently, Monomer x was added and agitation was performed for 40 minutes. Thereafter, 3.08 g of diethyl zinc solution was added and agitation was performed for 1 minute to obtain a polymerization solution of Monomer x. Monomer y solution prepared by adding Monomer y to 11 g of THF and adding 4.53 g of diethyl zinc solution in four batches was dropped on the polymerization solution of Monomer x over 6 minutes. After dropping was finished, agitation was performed for 60 minutes and, furthermore, 1.3 g of acetic acid was added to terminate the reaction. An XY diblock polymer was obtained by adding 2.8 g of 35.0% hydrochloric acid aqueous solution to the resulting solution, performing agitation at room temperature for 10 minutes, and performing washing three times with pure water, followed by drying.

The molecular weight of the resulting XY diblock polymer was measured with GPC provided with a differential refractometer (produced by Tosoh Corporation) by using polystyrene as a standard substance and THF as a solvent. It was ascertained that tBMA was hydrolyzed because a peak was present at a chemical shift value δ: 12 to 13 of a carboxyl group of MAA on the basis of the proton nuclear magnetic resonance ($^1$H-NMR) spectroscopy. In addition, constituent ratios of monomers constituting each block were analyzed on the basis of the $^1$H-NMR measurement. As for the acid value, the XY diblock polymer was dissolved into THF, and the acid value was measured with Automatic Potentiometric Titrator AT510 (produced by Kyoto Electronics Manufacturing Co., Ltd.) by using a 0.5 mol/L potassium hydroxide ethanol solution as a titrant.

The resulting XY diblock polymer was dissolved into THF, a potassium hydroxide aqueous solution in an amount 0.8 times the amount equivalent, on a mole basis, to the acid value of the polymer and an appropriate amount of water were added, and agitation was performed. Thereafter, THF was removed under the condition of reduced pressure, and water was added, so as to obtain 25.0 percent by mass Polymer aqueous solutions 75 to 77.

mer was measured by the $^1$H-NMR spectroscopy and it was ascertained that no trimethylsilyl ester group remained. The resulting ABC triblock polymer was dissolved into THF, a potassium hydroxide aqueous solution in an amount 0.8 times the amount equivalent, on a mole basis, to the acid value of the polymer and an appropriate amount of water were added, and agitation was performed. Thereafter, THF was removed under the condition of reduced pressure, and water was added, so as to obtain 25.0 percent by mass Polymer aqueous solution 84.

Preparation of Polymer Aqueous Solution 85

Dropping of 107 g (121 mL, 0.677 mol) of trimethylsilyl methacrylate on a solution of 9.05 g (10.5 mL, 51.9 mmol) of 1-methoxy-1-trimethylsiloxy-2-methyl-1-propene and 2 mL of tetrabutylammonium biacetate (0.1 mol/L in propylene carbonate) in 150 mL of THF was performed. During dropping, the temperature of the reaction solution increased gradually, and 2 mL of tetrabutylammonium biacetate (0.1 mol/L in propylene carbonate) was added. After all monomers were added, the temperature continued increasing to 57° C. When the temperature was lowered to 33° C., 91.6 g (88.6 mL, 0.52 mol) of BzMA purified by being passed through a basic alumina column in an argon atmosphere was added.

TABLE 3

Preparation condition of Polymer aqueous solution

| Polymer aqueous solution No. | Monomer x | | | | | | Monomer z | | | | | |
|---|---|---|---|---|---|---|---|---|---|---|---|---|
| | Type | Usage (g) | (part) | Type | Usage (g) | (part) | Type | Usage (g) | (part) | Type | Usage (g) | (part) |
| 75 | BzMA | 0.799 | 70.6 | — | 0 | 0 | tBMA | 0.332 | 29.4 | — | 0 | 0 |
| 76 | BzMA | 0.700 | 67.3 | — | 0 | 0 | HEMA | 0.238 | 22.9 | tBMA | 0.102 | 9.8 |
| 77 | BzMA | 0.700 | 67.3 | HEMA | 0.238 | 22.9 | tBMA | 0.102 | 9.8 | — | 0 | 0 |

Preparation of Polymer Aqueous Solution 84 propping of 268 g (304 mL, 1.69 mol) of trimethylsilyl methacrylate on a solution of 22.6 g (26.2 mL, 130 mmol) of 1-methoxy-1-trimethylsiloxy-2-methyl-1-propene and 0.1 mL of tetrabutylammonium biacetate (0.1 mol/L in propylene carbonate) in 300 mL of THF was performed. During dropping, the temperature of the reaction solution increased gradually, and 1.5 mL of tetrabutylammonium biacetate (0.1 mol/L in propylene carbonate) was added. After all monomers were added, the temperature was cooled to 30° C. Addition of 248 g (245 mL, 1.3 mol) of PEMA purified by being passed through a basic alumina column in an argon atmosphere was performed. Furthermore, 0.6 mL of tetrabutylammonium biacetate (0.1 mol/L in propylene carbonate) was added. After addition was finished, the temperature was cooled to 30° C., and 0.15 mL of tetrabutylammonium biacetate (0.1 mol/L in propylene carbonate) was added. Subsequently, 128 g (128 mL, 0.52 mol) of ETEGMA purified by being passed through a basic alumina column in argon atmosphere was dropped by using a dropping funnel, and 0.15 mL of tetrabutylammonium biacetate (0.1 mol/L in propylene carbonate) was added. It was ascertained on the basis of $^1$H-NMR spectroscopy that no remaining monomer was present. The resulting solution was refluxed together with 350 mL of 0.03 mol/L methanolic tetrabutylammonium fluoride and methanol for 16 hours. Distillation under reduced pressure was performed with a rotary evaporator to remove the solvent. A remaining polymer was dried in a vacuum oven at 50° C. for 48 hours, so that 515 g of MAA-PEMA-ETEGMA triblock polymer was obtained. The resulting triblock poly- When equilibrium was reached at a temperature of 39° C., additional 1 mL of tetrabutylammonium biacetate (0.1 mol/L in propylene carbonate) was added. After addition of monomer was finished, the temperature increased to 57° C. When the temperature was lowered to 35° C., 51.2 g (51.2 mL, 0.205 mol) of ETEGMA purified by being passed through a basic alumina column in an argon atmosphere was dropped by using a dropping funnel, and the resulting mixture was agitated for one night. It was ascertained on the basis of $^1$H-NMR spectroscopy that no remaining monomer was present. The resulting solution was refluxed together with 150 mL of 0.03 mol/L methanolic tetrabutylammonium fluoride and 100 mL of THF for 12 hours. Distillation under reduced pressure was performed with a rotary evaporator to remove the solvent, and a remaining polymer was dried in a vacuum oven at 50° C. for 48 hours, so that 186.3 g of MAA-BzMA-ETEGMA triblock polymer was obtained. The resulting triblock polymer was measured by the $^1$H-NMR spectroscopy and it was ascertained that no trimethylsilyl ester group remained. The resulting ABC triblock polymer was dissolved into THF, a potassium hydroxide aqueous solution in an amount 0.8 times the amount equivalent, on a mole basis, to the acid value of the polymer and an appropriate amount of water were added, and agitation was performed. Thereafter, THF was removed under the condition of reduced pressure, and water was added, so as to obtain 25.0 percent by mass Polymer aqueous solution 85.

Preparation of Polymer Aqueous Solution 86

The inside of a glass container provided with a three-way stopcock was substituted with nitrogen, and adsorbed water was removed by heating to 250° C. in a nitrogen gas atmosphere. After the system was returned to room temperature, isobutyl vinyl ether ($CH_2=CHOCH_2CH(CH_3)_2$) (hereafter abbreviated as IBVE) was added to 16 mmol of ethyl acetate, 0.05 mmol of 1-isobutoxyethyl acetate, and 11 mL of toluene, and the reaction system was cooled. When the temperature in the system reached 0° C., 0.2 mmol of ethylaluminum sesquichloride (an equimolar mixture of diethylaluminum chloride and ethylaluminum dichloride) was added and polymerization was effected. The molecular weight was subjected to time-division monitoring by using GPC and, thereby, completion of polymerization of isobutyl vinyl ether was ascertained. Subsequently, 2-(2-methoxyethoxy)-ethyl-vinyl ether ($CH_2=CHOCH_2CH_2OCH_2CH_2OCH_3$) (hereafter abbreviated as MEEVE) was added and polymerization was continued. Completion of polymerization of 2-(2-methoxyethoxy)-ethyl-vinyl ether was ascertained through monitoring by using GPC. Thereafter, a toluene solution of a monomer to form a unit structure, in which a carboxylic acid portion in benzoic acid 2-vinyloxyethyl ether ($CH_2=CHOCH_2CH_2OPhCOOH$: Ph represents a phenyl group) (hereafter abbreviated as BzAVEE) was esterified, was added, and a polymerization reaction was effected for 20 hours. The polymerization reaction was terminated by adding a 0.3 percent by mass ammonia/methanol aqueous solution into the system. The reaction mixture solution was diluted with dichloromethane and was washed three times with 0.6 mol/L hydrochloric acid aqueous solution and three times with distilled water. The resulting organic phase was concentrated and exsiccated with an evaporator and was vacuum-dried. Dialysis in a methanol solvent by using a cellulose semipermeable membrane was repeated to remove monomeric compounds. Neutralization with 0.1 mol/L hydrochloric acid aqueous solution was performed in an aqueous dispersion, so as to obtain a triblock polymer in which a sodium salt portion in the C block was converted to free carboxylic acid. The compound was identified by using $^1$H-NMR and GPC. The obtained ABC triblock polymer was dissolved into THF, a potassium hydroxide aqueous solution in an amount 0.8 times the amount equivalent, on a mole basis, to the acid value of the polymer and an appropriate amount of water were added, and agitation was performed. Thereafter, THF was removed under the condition of reduced pressure, and water was added, so as to obtain 25.0 percent by mass Polymer aqueous solution 86.

The polymer compositions and the properties of Polymer aqueous solutions 1 to 86 obtained as described above are shown in Table 4 to Table 7.

TABLE 4

Polymer composition and properties of polymer aqueous solution

| Polymer aqueous solution No. | X block Type | X block Composition ratio (percent by mass) | Y block Type | Y block Composition ratio (percent by mass) | Z block Type | Z block Composition ratio (percent by mass) | Acid value (mgKOH/g) | Proportion of A block in polymer (percent by mass) | Number average molecular weight Mn | Molecular weight distribution Mw/Mn | Proportion of A block/unit derived from acid monomer | Mn/acid value |
|---|---|---|---|---|---|---|---|---|---|---|---|---|
| 1 | BzMA | 70.0 | HEMA | 23.9 | MAA | 6.1 | 40 | 70.0 | 4000 | 1.2 | 11.5 | 100 |
| 2 | St | 48.0 | HEMA | 49.1 | MAA | 2.9 | 19 | 48.0 | 46000 | 2.1 | 16.6 | 2421 |
| 3 | St | 48.0 | HEMA | 18.9 | MAA | 3.1 | 20 | 48.0 | 46000 | 2.1 | 15.5 | 2300 |
| 4 | St | 30.0 | HEMA | 63.9 | MAA | 6.1 | 40 | 30.0 | 46000 | 2.1 | 4.9 | 1150 |
| 5 | St | 30.0 | HEMA | 56.2 | MAA | 13.8 | 90 | 30.0 | 46000 | 2.1 | 2.2 | 511 |
| 6 | St | 30.0 | HEMA | 47.0 | MAA | 23.0 | 150 | 30.0 | 46000 | 2.1 | 1.3 | 307 |
| 7 | St | 30.0 | HEMA | 46.9 | MAA | 23.1 | 151 | 30.0 | 46000 | 2.1 | 1.3 | 305 |
| 8 | BzMA | 19.0 | HEMA | 57.9 | MAA | 23.1 | 151 | 19.0 | 3900 | 2.1 | 0.8 | 26 |
| 9 | BzMA | 20.0 | HEMA | 56.9 | MAA | 23.1 | 151 | 20.0 | 3900 | 2.1 | 0.9 | 26 |
| 10 | BzMA | 40.0 | HEMA | 36.9 | MAA | 23.1 | 151 | 40.0 | 3900 | 2.1 | 1.7 | 26 |
| 11 | BzMA | 60.0 | HEMA | 16.9 | MAA | 23.1 | 151 | 60.0 | 3900 | 2.1 | 2.6 | 26 |
| 12 | BzMA | 80.0 | HEMA | 17.1 | MAA | 2.9 | 19 | 80.0 | 3900 | 2.1 | 27.6 | 205 |
| 13 | BzMA | 81.0 | HEMA | 16.1 | MAA | 2.9 | 19 | 81.0 | 3900 | 2.1 | 27.9 | 205 |
| 14 | BzMA | 81.0 | HEMA | 16.1 | MAA | 2.9 | 19 | 81.0 | 990 | 2.1 | 27.9 | 52 |
| 15 | BzMA | 81.0 | HEMA | 16.1 | MAA | 2.9 | 19 | 81.0 | 1000 | 2.1 | 27.9 | 53 |
| 16 | BzMA | 81.0 | HEMA | 16.1 | MAA | 2.9 | 19 | 81.0 | 4000 | 2.1 | 27.9 | 211 |
| 17 | BzMA | 81.0 | HEMA | 16.1 | MAA | 2.9 | 19 | 81.0 | 10000 | 2.1 | 27.9 | 526 |
| 18 | BzMA | 81.0 | HEMA | 16.1 | MAA | 2.9 | 19 | 81.0 | 30000 | 2.1 | 27.9 | 1579 |
| 19 | BzMA | 81.0 | HEMA | 16.1 | MAA | 2.9 | 19 | 81.0 | 30100 | 2.1 | 27.9 | 1584 |
| 20 | BzMA | 81.0 | HEMA | 16.1 | MAA | 2.9 | 19 | 81.0 | 31000 | 1.1 | 27.9 | 1632 |
| 21 | BzMA | 81.0 | HEMA | 16.1 | MAA | 2.9 | 19 | 81.0 | 31000 | 1.2 | 27.9 | 1632 |
| 22 | BzMA | 81.0 | HEMA | 16.1 | MAA | 2.9 | 19 | 81.0 | 31000 | 1.4 | 27.9 | 1632 |
| 23 | BzMA | 81.0 | HEMA | 16.1 | MAA | 2.9 | 19 | 81.0 | 31000 | 1.7 | 27.9 | 1632 |
| 24 | BzMA | 81.0 | HEMA | 16.1 | MAA | 2.9 | 19 | 81.0 | 31000 | 2.0 | 27.9 | 1632 |
| 25 | BzMA | 81.0 | HEMA | 16.1 | MAA | 2.9 | 19 | 81.0 | 31000 | 2.1 | 27.9 | 1632 |
| 26 | St | 14.3 | HEMA | 82.8 | MAA | 2.9 | 19 | 14.3 | 30100 | 2.1 | 4.9 | 1584 |
| 27 | St | 14.6 | HEMA | 82.5 | MAA | 2.9 | 19 | 14.6 | 30100 | 2.1 | 5.0 | 1584 |
| 28 | St | 20.4 | HEMA | 76.7 | MAA | 2.9 | 19 | 20.4 | 30100 | 2.1 | 7.0 | 1584 |
| 29 | St | 29.1 | HEMA | 68.0 | MAA | 2.9 | 19 | 29.1 | 30100 | 2.1 | 10.0 | 1584 |
| 30 | St | 43.5 | HEMA | 53.6 | MAA | 2.9 | 19 | 43.5 | 30100 | 2.1 | 15.0 | 1584 |
| 31 | St | 43.7 | HEMA | 53.4 | MAA | 2.9 | 19 | 43.7 | 30100 | 2.1 | 15.1 | 1584 |
| 32 | BzMA | 81.0 | MMA | 16.1 | MAA | 2.9 | 19 | 81.0 | 931 | 2.1 | 27.9 | 49 |
| 33 | BzMA | 81.0 | MMA | 16.1 | MAA | 2.9 | 19 | 81.0 | 950 | 2.1 | 27.9 | 50 |
| 34 | BzMA | 81.0 | MMA | 16.9 | MAA | 2.1 | 14 | 81.0 | 980 | 2.1 | 38.6 | 70 |
| 35 | BzMA | 81.0 | MMA | 17.6 | MAA | 1.4 | 9 | 81.0 | 900 | 2.1 | 57.9 | 100 |
| 36 | BzMA | 81.0 | MMA | 18.2 | MAA | 0.8 | 5 | 81.0 | 980 | 2.1 | 101.3 | 200 |
| 37 | BzMA | 81.0 | MMA | 18.2 | MAA | 0.8 | 5 | 81.0 | 985 | 2.1 | 101.3 | 201 |

TABLE 5

Polymer composition and properties of polymer aqueous solution

| Polymer aqueous solution No. | X block Type | X block Composition ratio (percent by mass) | Y block Type | Y block Composition ratio (percent by mass) | Z block Type | Z block Composition ratio (percent by mass) | Acid value (mgKOH/g) | Proportion of A block in polymer (percent by mass) | Number average molecular weight Mn | Molecular weight distribution Mw/Mn | Proportion of A block/unit derived from acid monomer | Mn/acid value |
|---|---|---|---|---|---|---|---|---|---|---|---|---|
| 38 | BzMA | 70.0 | MMA | 23.9 | MAA | 6.1 | 40 | 70.0 | 1960 | 1.2 | 11.5 | 49 |
| 39 | BzMA | 70.0 | MMA | 23.9 | MAA | 6.1 | 40 | 70.0 | 2000 | 1.2 | 11.5 | 50 |
| 40 | BzMA | 70.0 | MMA | 23.9 | MAA | 6.1 | 40 | 70.0 | 2800 | 1.2 | 11.5 | 70 |
| 41 | BzMA | 70.0 | MMA | 23.9 | MAA | 6.1 | 40 | 70.0 | 4000 | 1.2 | 11.5 | 100 |
| 42 | BzMA | 70.0 | MMA | 23.9 | MAA | 6.1 | 40 | 70.0 | 800 | 1.2 | 11.5 | 20 |
| 43 | BzMA | 70.0 | MMA | 23.9 | MAA | 6.1 | 40 | 70.0 | 8040 | 1.2 | 11.5 | 201 |
| 44 | St | 21.4 | HEA | 74.3 | AA | 4.4 | 34 | 21.4 | 6000 | 1.2 | 4.9 | 176 |
| 45 | St | 21.8 | HEA | 73.8 | AA | 4.4 | 34 | 21.8 | 6000 | 1.2 | 5.0 | 176 |
| 46 | St | 30.5 | HEA | 65.1 | AA | 4.4 | 34 | 30.5 | 6000 | 1.2 | 6.9 | 176 |
| 47 | St | 43.6 | HEA | 52.0 | AA | 4.4 | 34 | 43.6 | 6000 | 1.2 | 9.9 | 176 |
| 48 | St | 65.8 | HEA | 29.8 | AA | 4.4 | 34 | 65.8 | 6000 | 1.2 | 15.0 | 176 |
| 49 | St | 66.4 | HEA | 29.2 | AA | 4.4 | 34 | 66.4 | 6000 | 1.2 | 15.1 | 176 |
| 50 | BzMA | 70.0 | HEMA | 22.3 | MAA | 7.7 | 50 | 70.0 | 4000 | 1.1 | 9.1 | 80 |
| 51 | BzMA | 70.0 | HEMA | 22.3 | MAA | 7.7 | 50 | 70.0 | 4000 | 1.2 | 9.1 | 80 |
| 52 | BzMA | 70.0 | HEMA | 22.3 | MAA | 7.7 | 50 | 70.0 | 4000 | 1.4 | 9.1 | 80 |
| 53 | BzMA | 70.0 | HEMA | 22.3 | MAA | 7.7 | 50 | 70.0 | 4000 | 1.7 | 9.1 | 80 |
| 54 | BzMA | 70.0 | HEMA | 22.3 | MAA | 7.7 | 50 | 70.0 | 4000 | 2.0 | 9.1 | 80 |
| 55 | BzMA | 70.0 | HEMA | 22.3 | MAA | 7.7 | 50 | 70.0 | 4000 | 2.1 | 9.1 | 80 |
| 56 | BzMA | 45.0 | HEMA | 51.9 | MAA | 3.1 | 20 | 45.0 | 990 | 1.2 | 14.5 | 50 |
| 57 | BzMA | 45.0 | HEMA | 51.9 | MAA | 3.1 | 20 | 45.0 | 1000 | 1.2 | 14.5 | 50 |
| 58 | BzMA | 70.0 | HEMA | 17.7 | MAA | 12.3 | 80 | 70.0 | 4000 | 1.2 | 5.7 | 50 |
| 59 | BzMA | 80.0 | HEMA | 1.6 | MAA | 18.4 | 120 | 80.0 | 10000 | 1.2 | 4.3 | 83 |
| 60 | BzMA | 70.0 | HEMA | 7.0 | MAA | 23.0 | 150 | 70.0 | 30000 | 1.2 | 3.0 | 200 |
| 61 | BzMA | 70.0 | HEMA | 7.0 | MAA | 23.0 | 150 | 70.0 | 30100 | 1.2 | 3.0 | 201 |
| 62 | BzMA | 19.0 | HEMA | 77.2 | MAA | 3.8 | 25 | 19.0 | 4000 | 1.2 | 5.0 | 160 |
| 63 | BzMA | 20.0 | HEMA | 76.2 | MAA | 3.8 | 25 | 20.0 | 4000 | 1.2 | 5.3 | 160 |
| 64 | BzMA | 40.0 | HEMA | 52.3 | MAA | 7.7 | 50 | 40.0 | 4000 | 1.2 | 5.2 | 80 |
| 65 | BzMA | 60.0 | HEMA | 29.3 | MAA | 10.7 | 70 | 60.0 | 4000 | 1.2 | 5.6 | 57 |
| 66 | BzMA | 80.0 | HEMA | 9.3 | MAA | 10.7 | 70 | 80.0 | 4000 | 1.2 | 7.5 | 57 |
| 67 | BzMA | 81.0 | HEMA | 8.3 | MAA | 10.7 | 70 | 81.0 | 4000 | 1.2 | 7.6 | 57 |
| 68 | St | 30.0 | HEMA | 67.1 | MAA | 2.9 | 19 | 30.0 | 3500 | 1.2 | 10.3 | 184 |
| 69 | St | 30.0 | HEMA | 66.9 | MAA | 3.1 | 20 | 30.0 | 3500 | 1.2 | 9.7 | 175 |
| 70 | St | 35.0 | HEMA | 58.9 | MAA | 6.1 | 40 | 35.0 | 3500 | 1.2 | 5.7 | 88 |
| 71 | St | 70.0 | HEMA | 16.2 | MAA | 13.8 | 90 | 70.0 | 7000 | 1.2 | 5.1 | 78 |
| 72 | St | 65.0 | HEMA | 12.0 | MAA | 23.0 | 150 | 65.0 | 10000 | 1.2 | 2.8 | 67 |
| 73 | St | 65.0 | HEMA | 11.9 | MAA | 23.1 | 151 | 65.0 | 10000 | 1.2 | 2.8 | 66 |

TABLE 6

Polymer composition and properties of polymer aqueous solution

| Polymer aqueous solution No. | X block Type | X block Composition ratio (percent by mass) | Type | Composition ratio (percent by mass) | Type | Composition ratio (percent by mass) | Y block Type | Y block Composition ratio (percent by mass) | Type | Composition ratio (percent by mass) |
|---|---|---|---|---|---|---|---|---|---|---|
| 74 | BzMA | 70.0 | HEMA | 23.8 | MAA | 6.2 | — | — | — | — |
| 75 | BzMA | 79.9 | — | — | — | — | MAA | 20.1 | — | — |
| 76 | BzMA | 70.0 | — | — | — | — | HEMA | 23.8 | MAA | 6.2 |
| 77 | BzMA | 70.0 | HEMA | 23.8 | — | — | MAA | 6.2 | — | — |

| Polymer aqueous solution No. | Acid value (mgKOH/g) | Proportion of A block in polymer (percent by mass) | Number average molecular weight Mn | Molecular weight distribution Mw/Mn | Proportion of A block/unit derived from acid monomer | Mn/acid value |
|---|---|---|---|---|---|---|
| 74 | 40 | 70.0 | 4000 | 1.2 | 11.3 | 100 |
| 75 | 131 | 79.9 | 10000 | 1.2 | 4.0 | 76 |
| 76 | 40 | 70.0 | 4000 | 1.2 | 11.3 | 100 |
| 77 | 10 | 70.0 | 4000 | 1.2 | 11.3 | 400 |

TABLE 7

Polymer composition and properties of polymer aqueous solution

| | X block | | Y block | | Z block | | |
|---|---|---|---|---|---|---|---|
| Polymer aqueous solution No. | Type | Composition ratio (percent by mass) | Type | Composition ratio (percent by mass) | Type | Composition ratio (percent by mass) | Acid value (mgKOH/g) |
| 78 | HEMA | 23.8 | BzMA | 70.0 | MAA | 6.2 | 40 |
| 79 | BzMA | 70.0 | MAA | 6.2 | HEMA | 23.8 | 40 |
| 80 | SMA | 20.0 | nBMA | 40.0 | MTEGMA | 40.0 | 0 |
| 81 | BzMA | 70.0 | MTEGMA | 23.8 | MAA | 6.2 | 40 |
| 82 | MTEGMA | 70.0 | HEMA | 23.8 | MAA | 6.2 | 40 |
| 83 | BzMA | 70.0 | HEMA | 23.8 | MTEGMA | 6.2 | 0 |
| 84 | MAA | 28.0 | PEMA | 47.0 | ETEGMA | 25.0 | 163 |
| 85 | MAA | 29.0 | BzMA | 45.0 | ETEGMA | 26.0 | 170 |
| 86 | IBVE | 54.0 | MEEVE | 30.0 | BzAVEE | 16.0 | 43 |

| Polymer aqueous solution No. | Proportion of A block in polymer (percent by mass) | Number average molecular weight Mn | Molecular weight distribution Mw/Mn | Proportion of A block/ unit derived from acid monomer | Mn/ acid value |
|---|---|---|---|---|---|
| 78 | 70.0 | 4000 | 1.2 | 11.3 | 100 |
| 79 | 70.0 | 4000 | 1.2 | 11.3 | 100 |
| 80 | 0 | 4000 | 1.2 | — | — |
| 81 | 70.0 | 4000 | 1.2 | 11.3 | 100 |
| 82 | 0 | 4000 | 1.2 | 0 | 100 |
| 83 | 70.0 | 4000 | 1.2 | — | — |
| 84 | 47.0 | 4000 | 1.2 | 1.7 | 25 |
| 85 | 45.0 | 4000 | 1.2 | 1.6 | 24 |
| 86 | 16.0 | 19700 | 1.2 | 1.0 | 458 |

Preparation of Pigment Dispersion

Preparation of Cyan Pigment Dispersion C1

The following components were mixed, and were heated to 70° C. in a water bath, so as to dissolve a polymer dispersing agent under agitation.

| | |
|---|---|
| Polymer dispersing agent: JONCRYL68 3 (produced by BASF) | 10.0 parts |
| 2-Pyrrolidone | 10.0 parts |
| Potassium hydroxide | 1.35 parts |
| Ion-exchanged water | 63.65 parts |

The resulting solution was blended with 15.0 parts of a cyan pigment C. I. Pigment Blue 15:3 (IRGALITE Blue 8700; produced by Ciba Specialty Chemicals), and premixing was performed for 30 minutes. Thereafter, a dispersion treatment (beads used: zirconia beads having a diameter of 0.05 mm, beads filling factor: 70 percent by mass (in terms of bulk specific gravity), the number of revolutions of rotor: 42.1 Hz, dispersion time: 2 hours) was performed by using a beads mill UAM-015 (produced by KOTOBUKI ENGINEERING & MANUFACTURING CO., LTD.), so as to obtain Cyan pigment dispersion C1 (pigment content was 15.0 percent by mass).

Preparation of Red Pigment Dispersion R1

Red pigment dispersion R1 (pigment content was 15.0 percent by mass) was prepared in the same manner as Cyan pigment dispersion C1 except that the cyan pigment was changed to a red pigment C. I. Pigment Red 264 (IRGAZIN DPP Rubin FTX; produced by Ciba Specialty Chemicals).

Preparation of Magenta Pigment Dispersion M1

Magenta pigment dispersion M1 (pigment content was 15.0 percent by mass) was prepared in the same manner as Cyan pigment dispersion C1 except that the cyan pigment was changed to a magenta pigment C. I. Pigment Violet 19 (CUTULIA Red 2BP; produced by Dainichiseika Color & Chemicals Mfg. Co., Ltd.).

Preparation of Cyan Pigment Dispersion C2

Self-dispersing pigment Cab-O-Jet250C (produced by Cabot) was diluted with water and was agitated sufficiently, so as to obtain Cyan pigment dispersion C2 (pigment content was 10.0 percent by mass).

Preparation of Cyan Pigment Dispersion C3

Cyan pigment dispersion C3 was prepared, where Polymer aqueous solution 1 obtained as described above was used as a polymer dispersing agent. The following components were mixed, and were heated to 70° C. in a water bath, followed by agitation.

| | |
|---|---|
| Polymer dispersing agent: Polymer aqueous solution 1 (solid content 25.0 percent by mass) | 40.0 parts |
| 2-Pyrrolidone | 10.0 parts |
| Ion-exchanged water | 35.0 parts |

The resulting solution was blended with 15.0 parts of a cyan pigment C. I. Pigment Blue 15:3 (IRGALITE Blue 8700; produced by Ciba Specialty Chemicals), and premixing was performed for 30 minutes. Thereafter, a dispersion treatment (beads used: zirconia beads having a diameter of 0.05 mm, beads filling factor: 70 percent by mass (in terms of bulk specific gravity), the number of revolutions of rotor: 42.1 Hz, dispersion time: 2 hours) was performed by using a beads mill UAM-015 (produced by KOTOBUKI ENGINEERING & MANUFACTURING CO., LTD.), so as to obtain Cyan pigment dispersion C3 (pigment content was 15.0 percent by mass).

Preparation of Ink

Preparation of Ink 1

Cyan pigment dispersion C1 and Polymer aqueous solution 1 obtained as described above were mixed having the following composition.

| | |
|---|---|
| Cyan pigment dispersion C1 (pigment content was 15.0 percent by mass) | 20.0 percent by mass |
| Glycerin | 10.0 percent by mass |
| Ethylene glycol | 5.0 percent by mass |
| Polyethylene glycol (average molecular weight was 1,000) | 5.0 percent by mass |
| Acetylene glycol ethylene oxide adduct (produced by Kawaken Fine Chemicals Co., Ltd.) | 0.5 percent by mass |
| Polymer aqueous solution 1 (polymer content was 25.0 percent by mass) | 4.0 percent by mass |
| Ion-exchanged water | 55.5 percent by mass |

This was agitated sufficiently to disperse, so that Ink 1 having a triblock polymer content (percent by mass) 0.3 times the pigment content (percent by mass) on a mass ratio basis was prepared.

Inks 2 to 86

Inks 2 to 86 were obtained in the same manner as Ink 1 except that Polymer aqueous solution 1 was changed to Polymer aqueous solutions 2 to 86.

Ink 87

Ink 87 was obtained in the same manner as Ink 1 except that Cyan pigment dispersion C1 was changed to Red pigment dispersion R1.

Ink 88

Ink 88 was obtained in the same manner as Ink 1 except that Cyan pigment dispersion C1 was changed to Magenta pigment dispersion M1.

Ink 89

Ink 89 was obtained in the same manner as Ink 1 except that Cyan pigment dispersion C1 was changed to Cyan pigment dispersion C2.

Ink 90

Ink 90 was obtained in the same manner as Ink 1 except that Cyan pigment dispersion C1 was changed to Cyan pigment dispersion C3.

Ink 91

Cyan pigment dispersion C1 and Polymer aqueous solution 1 obtained as described above were mixed having the following composition.

| | |
|---|---|
| Cyan pigment dispersion C1 (pigment content was 15.0 percent by mass) | 13.4 percent by mass |
| Glycerin | 10.0 percent by mass |
| Ethylene glycol | 5.0 percent by mass |
| Polyethylene glycol (average molecular weight was 1,000) | 5.0 percent by mass |
| Acetylene glycol ethylene oxide adduct (produced by Kawaken Fine Chemicals Co., Ltd.) | 0.5 percent by mass |
| Polymer aqueous solution 1 (polymer content was 25.0 percent by mass) | 4.0 percent by mass |
| Ion-exchanged water | 62.1 percent by mass |

This was agitated sufficiently to disperse, so that Ink 91 having a triblock polymer content (percent by mass) 0.5 times the pigment content (percent by mass) on a mass ratio basis was prepared.

Ink 92

Cyan pigment dispersion C1 and Polymer aqueous solution 1 obtained as described above were mixed having the following composition.

| | |
|---|---|
| Cyan pigment dispersion C1 (pigment content was 15.0 percent by mass) | 16.6 percent by mass |
| Glycerin | 10.0 percent by mass |
| Ethylene glycol | 5.0 percent by mass |
| Polyethylene glycol (average molecular weight was 1,000) | 5.0 percent by mass |
| Acetylene glycol ethylene oxide adduct (produced by Kawaken Fine Chemicals Co., Ltd.) | 0.5 percent by mass |
| Polymer aqueous solution 1 (polymer content was 25.0 percent by mass) | 2.0 percent by mass |
| Ion-exchanged water | 60.9 percent by mass |

This was agitated sufficiently to disperse, so that Ink 92 having a triblock polymer content (percent by mass) 0.2 times the pigment content (percent by mass) on a mass ratio basis was prepared.

Ink 93

Cyan pigment dispersion C1 and Polymer aqueous solution 1 obtained as described above were mixed having the following composition.

| | |
|---|---|
| Cyan pigment dispersion C1 (pigment content was 15.0 percent by mass) | 14.0 percent by mass |
| Glycerin | 10.0 percent by mass |
| Ethylene glycol | 5.0 percent by mass |
| Polyethylene glycol (average molecular weight was 1,000) | 5.0 percent by mass |
| Acetylene glycol ethylene oxide adduct (produced by Kawaken Fine Chemicals Co., Ltd.) | 0.5 percent by mass |
| Polymer aqueous solution 1 (polymer content was 25.0 percent by mass) | 5.0 percent by mass |
| Ion-exchanged water | 60.5 percent by mass |

This was agitated sufficiently to disperse, so that Ink 93 having a triblock polymer content (percent by mass) 0.6 times the pigment content (percent by mass) on a mass ratio basis was prepared.

Ink 94

Cyan pigment dispersion C1 and Polymer aqueous solution 1 obtained as described above were mixed having the following composition.

| | |
|---|---|
| Cyan pigment dispersion C1 (pigment content was 15.0 percent by mass) | 22.0 percent by mass |
| Glycerin | 10.0 percent by mass |
| Ethylene glycol | 5.0 percent by mass |
| Polyethylene glycol (average molecular weight was 1,000) | 5.0 percent by mass |
| Acetylene glycol ethylene oxide adduct (produced by Kawaken Fine Chemicals Co., Ltd.) | 0.5 percent by mass |
| Polymer aqueous solution 1 (polymer content was 25.0 percent by mass) | 1.5 percent by mass |
| Ion-exchanged water | 56.0 percent by mass |

This was agitated sufficiently to disperse, so that Ink 94 having a triblock polymer content (percent by mass) 0.1 times the pigment content (percent by mass) on a mass ratio basis was prepared.

Ink 95

Ink 95 was prepared by the method disclosed in Example 4 of Japanese Patent Laid-Open No. 2005-179482 described above. Specifically, 7.5 parts of titanium dioxide particles (STT-65C-S produced by Titan Kogyou Ltd., crystal form: anatase, primary particle diameter: 0.03 to 0.05 μm) and 5.0 parts of C. I. Pigment Blue 15:3 were mixed with 12.5 parts of ammonium salt of styrene-acrylic acid copolymer (Mw 100,000, acid value 100, polymer component 30%) and 75.0 parts of ion-exchanged water sufficiently. Thereafter, the resulting mixed solution was dispersed together with glass beads (diameter 2 mm, mass of 0.5 times that of the mixed solution) in a sand mill (produced by Yasukawa Seisakusho). After dispersion, glass beads were removed, so as to obtain a pigment dispersion. Regarding the resulting pigment dispersion, the mass ratio (titanium dioxide particles/chromatic color pigment) of the titanium dioxide particles to the pigment was 1.50. The resulting pigment dispersion was mixed having the following composition.

| | |
|---|---|
| Pigment dispersion | 60.0 percent by mass |
| Glycerin | 20.0 percent by mass |
| 1,2-Hexane diol | 5.0 percent by mass |
| Triethanolamine | 0.9 percent by mass |
| OLFIN E1010 | 0.5 percent by mass |
| Ion-exchanged water | 13.6 percent by mass |

This was agitated sufficiently to disperse and was filtrated with a 10 μm membrane filter, so that Ink 95 was prepared.

Ink 96

Ink 96 was prepared by the method disclosed in Example 6 of Japanese Patent Laid-Open No. 2008-63500 described above.

Ink 97

Ink 97 was prepared by the method disclosed in Example 1 of Japanese Patent Laid-Open No. 2008-88427 described above.

Ink 98

Poly(4-methylbenzeneoxyethyl vinyl ether)-block-poly (methoxyethoxyethyl vinyl ether)-block-poly[4-{(vinyloxy)ethoxy}benzoic acid] was synthesized referring to the method for synthesizing Polymer 1 disclosed in Example of Japanese Patent Laid-Open No. 2010-137471. The composition ratio (percent by mass) was 48.7:39.9:11.4, the acid value was 31, the number average molecular weight Mn was 32,800, the molecular weight distribution Mw/Mn was 1.17, and the Mn/acid value was 1,069. The resulting triblock polymer was dissolved into THF, a potassium hydroxide aqueous solution in an amount 0.8 times the amount equivalent, on a mole basis, to the acid value of the polymer and an appropriate amount of water were added, and agitation was performed. Thereafter, THF was removed under the condition of reduced pressure, and water was added, so as to obtain 25.0 percent by mass Polymer aqueous solution. Ink 98 was obtained in the same manner as Ink 1 except that the resulting Polymer aqueous solution was used in place of Polymer aqueous solution 1.

Evaluation

According to aspects of the present invention, regarding the evaluation criteria in the following individual evaluation items, A to C were favorable levels, and D and E were unacceptable levels.

Glossiness of Image

Each of the inks obtained as described above was filled into an ink cartridge, and the ink cartridge was mounted on an ink jet recording apparatus PIXUS Pro9500 (produced by CANON KABUSHIKI KAISHA). Then, a solid image (image with recording duty of 100%) of 3 cm×3 cm was recorded on Canon Photo Paper Glossy Gold GL-101 (produced by CANON KABUSHIKI KAISHA), where a recording mode was "Canon Photo Paper Glossy Gold Standard mode". At this time, the recording condition was specified to be temperature: 23° C. and relative humidity: 55%. Regarding the above-described ink jet recording apparatus, the condition in which four droplets of 4 pL of ink were applied in a unit region of 1/600 inch×1/600 inch, where the resolution was 600 dpi×600 dpi, was defined as a recording duty of 100%. Regarding the image obtained at this time, the image clarity GC of the image on the basis of JIS K 7105 was measured by using an image clarity measuring apparatus (GP1-S; produced by OPTEC CO., LTD.). In this regard, larger image clarity GC refers to higher glossiness of the image. The evaluation criteria of the glossiness of the image were as described below. The evaluation results are shown in Table 8 and Table 9.

A: 55≤GC
B: 50≤GC<55
C: 40≤GC<50
D: 30≤GC<40
E: GC<30 or there was faint streaking in the solid image Bronze Resistance of Image Regarding the ink obtained as described above, the bronze resistance was evaluated by measuring the spectral characteristics of specular reflection light through the use of the image with recording duty of 100% obtained as in the item "Glossiness of image". At this time, a halogen light source apparatus (KTX-50R: produced by Fortissimo Corporation) was used, and colorimetry of specular reflection light on the image surface was performed with Multi Channel Photo Detector (MCPD-3700: produced by Otsuka Electronics Co., Ltd.), where the light was projected in such a way that the incident angle was 45 degrees from the direction normal to the image. Regarding each image, the ratio DR=Dmax/Dmin of the maximum reflected light intensity Dmax to the minimum reflected light intensity Dmin in the range of 300 nm to 780 nm was calculated, and the bronze resistance of the image was evaluated. The evaluation criteria of the bronze resistance of the image were as described below. The evaluation results are shown in Table 8 and Table 9.

A: DR≤1.2
B: 1.2<DR≤1.5
C, 1.5<DR≤1.8
D: 1.8<DR≤2.0
E: 2.0<DR or there was faint streaking in the solid image Ejection Stability of Ink Each of the inks obtained as described above was filled into an ink cartridge, and the ink cartridge was mounted on the ink jet recording apparatus PIXUS Pro9500 (produced by CANON KABUSHIKI KAISHA). Then, solid images (image with recording duty of 100%) of 17 cm×25 cm were recorded on Canon Photo Paper Glossy Gold GL-101 (produced by CANON KABUSHIKI KAISHA), where a recording mode was "Canon Photo Paper Glossy Gold Standard mode". Regarding the images obtained at this time, the 20-degree glossiness of the solid image on the basis of JIS Z 8741 was measured by using a glossmeter (Handy Gloss Meter PG-1M; produced by NIPPON DENSHOKU INDUSTRIES CO., LTD.). The ejection stability of the ink was evaluated by calculating the ratio DR=$GR_2/GR_1$ of the 20-degree glossiness of the hundredth sheet represented by $GR_2$ to the 20-degree glossiness of the image of the first sheet represented by $GR_1$. If ejection becomes unstable, a polymer layer formed by the ink becomes nonuniform and, thereby, the glossiness of the image is reduced. That is, as the value of DR approaches 1.0, it can be said that the ejection stability of the ink is high because it is indicated that the polymer layer of the hundredth image is formed uniformly in a manner similar to the polymer layer of the first image. The evaluation criteria of the ejection stability of the ink were as described below. The evaluation results are shown in Table 8 and Table 9.

A: $0.9 < DR$
B: $0.8 < DR \leq 0.9$
C: $0.6 < DR \leq 0.8$
D: $0.5 < DR \leq 0.6$
E: $DR \leq 0.5$ or there was faint streaking in the solid image Storage Stability of Ink Each of the inks obtained as described above was stored for one weak in an enclosed container at 60° C. Regarding each of the inks before and after the storage at this time, the volume average particle diameter of the pigment was measured by using Nanotrac particle size distribution measuring apparatus UPA-EX150 (produced by NIKKISO CO., LTD.). The storage stability of the ink was evaluated by calculating the ratio $P = D_{50\text{-}2}/D_{50\text{-}1}$ of the average particle diameter of the pigment in the ink after the storage test, which was represented by $D_{50\text{-}2}$, to the average particle diameter of the pigment in the ink before the storage test, which was represented by $D_{50\text{-}1}$. The evaluation criteria of the storage stability of the ink were as described below. The evaluation results are shown in Table 8 and Table 9.

A: $0.95 \leq P < 1.10$
B: $0.90 \leq P < 0.95$ or $1.10 \leq P < 1.20$
C: $0.85 \leq P < 0.90$ or $1.20 \leq P < 1.50$
D: $0.70 \leq P < 0.85$ or $1.50 \leq P < 2.00$
E: $P < 0.70$ or $2.00 \leq P$

TABLE 8

| Example | Ink | Glossiness of image | Bronze resistance of image | Ejection stability of ink | Storage stability of ink |
|---|---|---|---|---|---|
| Example 1 | Ink 1 | A | A | A | A |
| Example 2 | Ink 2 | C | B | C | C |
| Example 3 | Ink 3 | B | B | C | C |
| Example 4 | Ink 4 | B | B | C | C |
| Example 5 | Ink 5 | B | B | C | C |
| Example 6 | Ink 6 | B | B | C | C |
| Example 7 | Ink 7 | B | C | C | C |
| Example 8 | Ink 8 | B | C | C | C |
| Example 9 | Ink 9 | B | B | C | C |
| Example 10 | Ink 10 | B | B | C | C |
| Example 11 | Ink 11 | B | B | C | C |
| Example 12 | Ink 12 | B | B | C | C |
| Example 13 | Ink 13 | C | B | C | C |
| Example 14 | Ink 14 | B | C | C | C |
| Example 15 | Ink 15 | B | B | C | C |
| Example 16 | Ink 16 | B | B | C | C |
| Example 17 | Ink 17 | B | B | C | C |
| Example 18 | Ink 18 | B | B | C | C |
| Example 19 | Ink 19 | C | B | C | C |
| Example 20 | Ink 20 | C | B | C | C |
| Example 21 | Ink 21 | C | B | C | C |
| Example 22 | Ink 22 | C | B | C | C |
| Example 23 | Ink 23 | C | B | C | C |
| Example 24 | Ink 24 | C | B | C | C |
| Example 25 | Ink 25 | C | C | C | C |
| Example 26 | Ink 26 | B | C | C | C |
| Example 27 | Ink 27 | B | B | C | C |
| Example 28 | Ink 28 | B | B | C | C |
| Example 29 | Ink 29 | B | B | C | C |
| Example 30 | Ink 30 | B | B | C | C |
| Example 31 | Ink 31 | C | B | C | C |
| Example 32 | Ink 32 | C | C | C | C |
| Example 33 | Ink 33 | C | B | C | C |
| Example 34 | Ink 34 | C | B | C | C |
| Example 35 | Ink 35 | C | B | C | C |
| Example 36 | Ink 36 | C | B | C | C |
| Example 37 | Ink 37 | C | B | C | C |
| Example 38 | Ink 38 | A | B | A | A |
| Example 39 | Ink 39 | A | A | A | A |
| Example 40 | Ink 40 | A | A | A | A |
| Example 41 | Ink 41 | A | A | A | A |
| Example 42 | Ink 42 | A | A | A | A |
| Example 43 | Ink 43 | B | A | B | B |
| Example 44 | Ink 44 | A | B | A | A |
| Example 45 | Ink 45 | A | A | A | A |
| Example 46 | Ink 46 | A | A | A | A |
| Example 47 | Ink 47 | A | A | A | A |
| Example 48 | Ink 48 | A | A | A | A |
| Example 49 | Ink 49 | B | A | A | A |
| Example 50 | Ink 50 | A | A | A | A |

TABLE 9

| Example | Ink | Glossiness of image | Bronze resistance of image | Ejection stability of ink | Storage stability of ink |
|---|---|---|---|---|---|
| Example 51 | Ink 51 | A | A | A | A |
| Example 52 | Ink 52 | A | A | A | A |
| Example 53 | Ink 53 | A | A | A | A |
| Example 54 | Ink 54 | A | A | A | A |
| Example 55 | Ink 55 | B | B | B | B |
| Example 56 | Ink 56 | A | B | B | B |
| Example 57 | Ink 57 | A | A | A | A |
| Example 58 | Ink 58 | A | A | A | A |
| Example 59 | Ink 59 | A | B | A | A |
| Example 60 | Ink 60 | A | B | A | A |
| Example 61 | Ink 61 | B | B | B | B |
| Example 62 | Ink 62 | A | B | A | A |
| Example 63 | Ink 63 | A | A | A | A |
| Example 64 | Ink 64 | A | A | A | A |
| Example 65 | Ink 65 | A | A | A | A |
| Example 66 | Ink 66 | A | A | A | A |
| Example 67 | Ink 67 | B | A | B | B |
| Example 68 | Ink 68 | B | A | B | B |
| Example 69 | Ink 69 | A | A | A | A |
| Example 70 | Ink 70 | A | A | A | A |
| Example 71 | Ink 71 | A | A | A | A |
| Example 72 | Ink 72 | A | A | A | A |
| Example 73 | Ink 73 | A | B | A | A |
| Example 74 | Ink 87 | A | A | A | A |
| Example 75 | Ink 88 | A | A | A | A |
| Example 76 | Ink 89 | A | A | A | A |
| Example 77 | Ink 90 | A | A | A | A |
| Example 78 | Ink 91 | A | A | A | A |
| Example 79 | Ink 92 | A | A | A | A |
| Example 80 | Ink 93 | B | A | B | B |
| Example 81 | Ink 94 | A | B | A | A |
| Comparative example 1 | Ink 74 | E | E | C | C |
| Comparative example 2 | Ink 75 | E | D | C | C |
| Comparative example 3 | Ink 76 | E | D | C | C |
| Comparative example 4 | Ink 77 | E | E | C | C |
| Comparative example 5 | Ink 78 | E | E | D | D |
| Comparative example 6 | Ink 79 | D | C | D | D |
| Comparative | Ink 80 | E | E | D | D |

TABLE 9-continued

Evaluation result

| Example | Ink | Glossiness of image | Bronze resistance of image | Ejection stability of ink | Storage stability of ink |
|---|---|---|---|---|---|
| example 7 | | | | | |
| Comparative example 8 | Ink 81 | D | C | D | D |
| Comparative example 9 | Ink 82 | E | E | D | D |
| Comparative example 10 | Ink 83 | E | E | D | D |
| Comparative example 11 | Ink 84 | E | E | D | D |
| Comparative example 12 | Ink 85 | E | E | D | D | prepolymer solution. The resulting urethane prepolymer solution was cooled to 60° C., and potassium hydroxide aqueous solution was added to neutralize the acid group. Thereafter, cooling to 40° C. was performed, ion-exchanged water was added, and high-speed agitation was performed with a homomixer to effect emulsification. After the emulsification, a chain extension agent was added, and a chain extension reaction was effected at 30° C. for 12 hours. When the presence of an isocyanate group became not detected with FT-IR, methyl ethyl ketone was removed by distillation while the polymer solution was heated and decompressed, so that a polyurethane polymer emulsion dispersion having a polyurethane polymer content of 20.0 percent by mass and a weight average molecular weight of 30,000 was obtained. The acid value of the resulting polyurethane polymer emulsion was measured through potentiometric titration by using the above-described potassium hydroxide methanol titrant. As a result, every acid value was 30 mgKOH/g.

TABLE 10

Preparation condition of polyurethane polymer emulsion dispersion

| Polyurethane polymer emulsion dispersion No. | Polyisocyanate | | Polyol | | | Proportion of polyether polyol in polyol (percent by mass) | Diol having acid group Usage of DMPA (part) | Chain extension agent Usage of EDA (part) |
|---|---|---|---|---|---|---|---|---|
| | Type | Usage (part) | Type | Molecular weight | Usage (part) | | | |
| PU-1 | IPDI | 234.8 | PPG | 2000 | 693.5 | 100 | 71.7 | 10.6 |
| PU-2 | TDI | 189.0 | PPG | 2000 | 739.3 | 100 | 71.7 | 10.9 |
| PU-3 | IPDI | 512.1 | PPG | 300 | 416.3 | 100 | 71.7 | 23.1 |
| PU-4 | IPDI | 307.8 | PPG | 1000 | 620.6 | 100 | 71.7 | 14.1 |
| PU-5 | IPDI | 182.2 | PPG | 5000 | 746.2 | 100 | 71.7 | 8.2 |
| PU-6 | IPDI | 234.8 | PTMG | 2000 | 693.5 | 100 | 71.7 | 10.6 |
| PU-7 | IPDI | 234.8 | PEG | 2000 | 693.5 | 100 | 71.7 | 10.6 |
| PU-8 | IPDI | 234.8 | PPG | 2000 | 624.2 | 90 | 71.7 | 10.6 |
| | | | PC | 2000 | 69.4 | | | |

TABLE 9-continued

Evaluation result

| Example | Ink | Glossiness of image | Bronze resistance of image | Ejection stability of ink | Storage stability of ink |
|---|---|---|---|---|---|
| Comparative example 13 | Ink 86 | E | D | C | C |
| Comparative example 14 | Ink 95 | E | E | E | E |
| Comparative example 15 | Ink 96 | D | C | E | E |
| Comparative example 16 | Ink 97 | D | B | E | E |
| Comparative example 17 | Ink 98 | E | E | D | D |

Preparation of Polyurethane Polymer Emulsion Dispersion

Polyurethane polymer emulsion dispersion was prepared by a method described below. In this regard, the preparation condition of each polyurethane polymer emulsion dispersion is as shown in Table 10. A polyol was agitated and dissolved sufficiently in methyl ethyl ketone. A polyisocyanate and a diol having an acid group were added and reaction was effected at 75° C. for 1 hour, so as to obtain an urethane Preparation of Polymer Aqueous Solutions 87 and 88

In a nitrogen atmosphere, CuCl (0.5 mmol), Bpy (1.0 mmol), MCP (1.0 mmol), BzMA serving as Monomer x (usage: refer to Table 11), and DMF (usage: refer to Table 11) were mixed. After dissolved oxygen contained in the resulting mixture was substituted with nitrogen, a polymerization reaction of the X block was effected at 100° C. Subsequently, CuCl (0.1 mmol), PMDTA (0.1 mmol), Monomer y (usage: refer to Table 11), and DMF (15.0 mL) were mixed, and a polymerization reaction of the Y block was effected at 90° C. Then, CuCl (0.1 mmol), PMDTA (0.1 mmol), TMSMA serving as Monomer z (usage: refer to Table 11), and DMF (usage: refer to Table 11) were mixed, and a polymerization reaction of the Z block was effected at 90° C. The above-described polymerization reactions were effected while the degree of polymerization was ascertained by gas chromatography, and the reactions were terminated by quenching with liquid nitrogen. The reaction solution was passed through an aluminum column to remove a copper catalyst. Thereafter, the polymer solution was added to methanol, a supernatant fluid was removed, and precipitates were dried under reduced pressure. Furthermore, the resulting polymer was dissolved into THF, and concentrated hydrochloric acid was added under the reflux condition to convert a trimethyl silyl ester portion to carboxylic acid by a hydrolysis reaction. The reaction solution was added to methanol, a supernatant fluid was removed, and the precipitates were dried under reduced pressure. The resulting polymer was neutralized with a potassium hydroxide aqueous solution, so as to produce a polymer aqueous solution having a polymer content of 10.0 percent by mass. The polymer of Polymer aqueous solution 87 was PBzMA-block-PnBMA-block-PMAA (composition ratio (percent by mass) was 50.3:19.0:30.7), and the polymer of Polymer aqueous solution 88 was PBzMA-block-PHEMA-block-PMAA (composition ratio (percent by mass) was 67.5:21.6:10.8).

described above was 10.0 percent by mass, the pH was 8.0, and the average particle diameter of the pigment was 80 nm.

Preparation of Pigment Dispersion C

A reactor was charged with 500 g of carbon black having a specific surface area of 220 m$^2$/g and a DBP oil absorption of 112 mL/100 g, 45 g of aminophenyl(2-sulfoethyl)sulfone, and 900 g of distilled water, and agitation was performed at a temperature of 55° C. and the number of revolutions of 300 rpm for 20 minutes. Subsequently, 40 g of 25% sodium nitrate

TABLE 11

Preparation condition and characteristics of polymer aqueous solution

| Polymer aqueous solution No. | X component | | | Y component | | | Z component | | | Characteristics | |
|---|---|---|---|---|---|---|---|---|---|---|---|
| | Monomer x (BzMA) | | DMF | Monomer y | | | Monomer z (TMSMA) | | DMF | Number average molecular weight Mn (×10$^3$) | Molecular weight distribution |
| | (mmol) | (g) | (mL) | Type | (mmol) | (g) | (mmol) | (g) | (mL) | | |
| 87 | 70.0 | 11.3 | 10.0 | nBMA | 30.0 | 4.3 | 80.0 | 12.6 | 20.0 | 15.0 | 1.22 |
| 88 | 100.0 | 16.1 | 15.0 | HEMA | 40.0 | 5.2 | 30.0 | 4.7 | 15.0 | 14.0 | 1.24 |

Preparation of Pigment Dispersion
Preparation of Pigment Dispersion A

Commercially available Cab-O-Jet400 (produced by Cabot) serving as a self-dispersing carbon black pigment in which a hydrophilic group (phosphoric acid group) was introduced directly to the surface of carbon black was diluted with water and was agitated sufficiently, so as to obtain Pigment dispersion A. The content of the pigment in the resulting pigment dispersion was 10.0 percent by mass, the pH was 9.0, and the average particle diameter of the pigment was 110 nm.

Preparation of Pigment Dispersion B

In the state of being cooled to 5° C., 1.5 g of 4-amino-1,2-benzenedicarboxylic acid was added to a solution in which 5 g of concentrated hydrochloric acid was dissolved in 5.5 g of water. Subsequently, a container holding the resulting solution was put into an ice bath, so that the solution was brought into the state of being kept at 10° C. or lower constantly, and a solution in which 1.8 g of sodium nitrite was dissolved in 9 g of water at 5° C. was added thereto. The resulting solution was agitated for further 15 minutes and 6 g of carbon black having a specific surface area of 220 m$^2$/g and a DBP oil absorption of 105 ml/100 g was added under agitation. Thereafter, agitation was performed for further 15 minutes, the resulting slurry was filtrated with filter paper (trade name: Standard Filter Paper No. 2; produced by Advantec), and particles were washed with water sufficiently. The particles were dried in an oven at 110° C., so that self-dispersing carbon black was prepared. Moreover, a dispersion was prepared by adding water to the resulting self-dispersing carbon black and dispersing in such a way that the content of the pigment became 10.0 percent by mass. According to the above-described method, a pigment dispersion in the state in which the self-dispersing carbon black formed by introducing a —C$_6$H$_3$—(COONa)$_2$ group on the surfaces of carbon black particles was dispersed in water was obtained. Then, sodium ions in the pigment dispersion were substituted with potassium ions by using an ion exchanging method and, thereby, Pigment dispersion B in which self-dispersing carbon black formed by introducing the —C$_6$H$_3$—(COOK)$_2$ group on the surface of carbon black was dispersed was obtained. The content of the pigment in Pigment dispersion B prepared as was dropped over 15 minutes, 50 g of distilled water was further added, and a reaction was effected at 60° C. for 2 hours. The resulting reaction product was taken out while being diluted with distilled water, so as to be adjusted in such a way that the pigment content became 15.0 percent by mass. A centrifugal separation treatment and a refining treatment were performed to remove impurities and, thereby, Dispersion (1) was obtained. The carbon black in the Dispersion (1) was in the state in which a functional group of aminophenyl (2-sulfoethyl)sulfone was attached to the surface. The number of moles of the functional group attached to the carbon black in the Dispersion (1) was determined as described below. The sodium ion in the Dispersion (1) was measured with a probe type sodium electrode, the resulting value was converted to a value per mole of carbon black powder and the number of moles of functional group attached to the carbon black was determined. Then, the Dispersion (1) was dropped into a pentaethylenehexamine solution. At this time, the pentaethylenehexamine solution was kept at room temperature while being agitated vigorously, and Dispersion (1) was dropped over 1 hour. At this time, the content of the pentaethylenehexamine was specified to be 1 to 10 times the number of moles of sodium ion measured in advance, and the amount of the solution was specified to be equal to the amount of Dispersion (1). After the resulting mixture was agitated for 18 to 48 hours, a refining treatment was performed, so as to obtain Dispersion (2) having a pigment content of 10.0 percent by mass. The carbon black in the Dispersion (2) was in the state in which pentaethylenehexamine was attached to the surface. Next, 190 g of styrene-acrylic acid polymer having a weight average molecular weight of 8,000, an acid value of 140 mgKOH/g, and a molecular weight distribution Mw/Mn (weight average molecular weight Mw, number average molecular weight Mn) of 1.5 was weighed. A styrene-acrylic acid polymer aqueous solution was prepared by adding 1,800 g of distilled water to the polymer, adding potassium hydroxide required to neutralize the polymer, and agitating to dissolve the polymer. Subsequently, 500 g of Dispersion (2) was dropped into the styrene-acrylic acid polymer aqueous solution obtained as described above. The resulting mixture of Dispersion (2) and the styrene-acrylic acid polymer aqueous solution was transferred to an evaporating dish and was heated at 150° C. for 15 hours, so as to be dried. The dried material was cooled to room temperature. The dried material obtained as described above was added to distilled water exhibiting a pH of 9.0 which was adjusted by using potassium hydroxide. Dispersion was performed by using a dispersing machine, and the pH of the liquid was adjusted to be 10 to 11 by adding 1.0 mol/L potassium hydroxide aqueous solution under agitation. Then, demineralization and a refining treatment were performed to remove impurities and coarse particles. According to the above-described method, Pigment dispersion C in the state in which polymer-attached self-dispersing carbon black was dispersed in water was obtained. The content of the pigment in Pigment dispersion C prepared as described above was 10.0 percent by mass, the pH was 10.1, and the average particle diameter of the pigment was 130 nm.

Preparation of Pigment Dispersion D

A styrene-acrylic acid polymer having an acid value of 200 mgKOH/g and a weight average molecular weight of 10,000 was neutralized with a 10% potassium hydroxide aqueous solution. Thereafter, 20 parts of the resulting polymer, 10 parts of carbon black having a specific surface area of 210 m$^2$/g and a DBP oil absorption of 74 mL/100 g, and 70 parts of water were mixed. The resulting mixture was dispersed for 1 hour by using a sand grinder and was subjected to a centrifugal separation treatment to remove coarse particles. Pressure filtration was performed with a microfilter having a pore size of 3.0 μm (produced by Fuji Photo Film Co., Ltd.). According to the above-described method, Pigment dispersion D in the state in which polymer-dispersing carbon black was dispersed in water was obtained. The content of the pigment in Pigment dispersion D prepared as described above was 10.0 percent by mass, the pH was 10.0, and the average particle diameter of the pigment was 120 nm.

Preparation of Ink

Pigment dispersion, Polyurethane polymer emulsion dispersion, and Polymer aqueous solution, which were obtained as described above, in combination shown in Table 12 were mixed with the following individual components. In this regard, the remainder, which was the amount of ion-exchanged water, refers to the amount determined in such a way that the total of all components constituting the ink became 100.0 percent by mass.

| | |
|---|---|
| Pigment dispersion (pigment content was 10.0 percent by mass) | refer to Table 12 |
| Polyurethane polymer emulsion dispersion (polymer content was 20.0 percent by mass) | refer to Table 12 |
| Polymer aqueous solution (polymer content was 10.0 percent by mass) | refer to Table 12 |
| Glycerin | 9.0 percent by mass |
| Diethylene glycol | 5.0 percent by mass |
| Triethylene glycol | 5.0 percent by mass |
| Acetylenol E100 (surfactant: produced by Kawaken Fine Chemicals Co., Ltd.) | 0.1 percent by mass |
| Ion-exchanged water | remainder |

This was agitated sufficiently so as to disperse. Thereafter, pressure filtration was performed with a microfilter having a pore size of 3.0 μm (produced by Fuji Photo Film Co., Ltd.) to prepare each ink.

Evaluation

According to aspects of the present invention, regarding the evaluation criteria in the following individual evaluation items, A to C were favorable levels, and D was an unacceptable level. Each of the following evaluations was performed by using an ink jet recording apparatus PIXUS iP3100 (produced by CANON KABUSHIKI KAISHA). The recording condition was specified to be the temperature of 23° C., the relative humidity of 55%, and the amount of ejection per droplet of 28 ng±within 10%. Regarding the above-described ink jet recording apparatus, an image recorded under the condition in which one droplet of about 28 ng of ink was applied in a unit region of $\frac{1}{600}$ inch×$\frac{1}{600}$ inch, where the resolution was 600 dpi×600 dpi, was defined as an image with a recording duty of 100%.

Scratch Resistance

Each of the inks obtained as described above was filled into an ink cartridge, and the ink cartridge was mounted on the above-described ink jet recording apparatus. Then, a solid image (image with recording duty of 100%) of 1 inch×0.5 inches was printed on PPC Paper GF-500 (produced by CANON KABUSHIKI KAISHA). Silbon paper and a balance weight having a bearing stress of 40 g/cm$^2$ were placed on the solid images obtained ten minutes after printing and one day after printing, and the solid image and the Silbon paper were rubbed against each other. Thereafter, Silbon paper and the balance weight were removed, and the extent of stain of the solid image and transfer of Silbon paper to the white ground portion were visually observed. The evaluation criteria of the scratch resistance were as described below. The evaluation results are shown in Table 12.

A: At ten minutes after, stain of the white ground portion was observed to some extent, but was at an almost unobtrusive level. At one day after, stain of the white ground portion was not observed.

B: At ten minutes after, stain of the white ground portion was observed to some extent, but was at an almost unobtrusive level. At one day after, stain of the white ground portion was hardly observed.

C: At ten minutes after and one day after, stain of the white ground portion was observed to some extent, but was at an almost unobtrusive level.

D: At ten minutes after and one day after, stain of the white ground portion was observed.

Highlighter Resistance of Image

Each of the inks obtained as described above was filled into an ink cartridge, and the ink cartridge was mounted on the above-described ink jet recording apparatus. Then, a vertical ruled line having a thickness of $\frac{1}{10}$ inch was recorded on PPC Paper GF-500 (produced by CANON KABUSHIKI KAISHA). Marking was performed on the vertical ruled lines obtained 5 minutes after printing and 1 day after printing with a yellow line marker OPTEX2 (produced by ZEBRA CO., Ltd.). Immediately after that, marking was performed on a white ground portion on the image medium, and contamination of a pen nib and contamination of the marking on the white ground portion were examined. The evaluation criteria of the highlighter resistance were as described below. The evaluation results are shown in Table 12.

A: In the test after five minutes and the test after one day, although a slight coloring on the pen nib was observed, little contamination of the line on the white ground was observed.

B: In the test after five minutes, although coloring on the pen nib was observed, contamination of the line on the white ground was at an almost unobtrusive level. In the test after one day, although a slight coloring on the pen nib was observed, little contamination of the line on the white ground was observed.

C: In the test after five minutes and the test after one day, although coloring on the pen nib was observed, little contamination of the line on the white ground was observed.

D: In the test after five minutes and the test after one day, there were significant coloring on the pen nib and contamination of the line on the white ground.

Ejection Stability of Ink

Each of the inks obtained as described above was filled into an ink cartridge, and the ink cartridge was mounted on the above-described ink jet recording apparatus. Then, 10 sheets of solid image (image with recording duty of 100%) of 19 cm×26 cm were printed on A4-size PPC Paper GF-500 (produced by CANON KABUSHIKI KAISHA). At this time, the ejection stability of the ink was evaluated by visually observing the fifth and the tenth sheets of solid images. The evaluation criteria of the ejection stability of the ink were as described below. The evaluation results are shown in Table 12.

A: Regarding the fifth sheet and the tenth sheet, white streaks and faint streaking were not observed.

B: The fifth sheet was recorded normally. Regarding the tenth sheet, there were white streaks and faint streaking slightly, but they were at almost unobtrusive levels.

C: The fifth sheet was recorded normally. Regarding the tenth sheet, there were white streaks and faint streaking, but they were at acceptable levels.

D: Regarding the fifth and the tenth sheets, there were white streaks and faint streaking.

Frequency Responsibility of Ink

Each of the inks obtained as described above was filled into an ink cartridge, the ink cartridge was mounted on the above-described ink jet recording apparatus modified in such a way that the drive condition was able to be controlled, and the drive voltage was set at 25 V. The frequency responsibility of the ink was evaluated by visually observing non-ejection, lacking, and irregularities in recording during continuous recording under the condition of drive frequency of each of 1 KHz, 5 KHz, and 10 KHz. The evaluation criteria of the frequency responsibility of the ink were as described below. The evaluation results are shown in Table 12.

A: At every frequency, non-ejection, lacking, and irregularities in recording were hardly observed during continuous recording.

B: At frequencies of 1 KHz and 5 KHz, non-ejection, lacking, and irregularities in recording were hardly observed during continuous recording. At a frequency of 10 KHz, irregularities in ejection occurred significantly from the first character, and recorded characters were illegible.

C: Only at a frequency of 1 KHz, non-ejection, lacking, and irregularities in recording were hardly observed during continuous recording. At frequencies of 5 KHz and 10 KHz, irregularities in ejection occurred significantly from the first character, and recorded characters were illegible.

D: Even at a frequency of 1 KHz, irregularities in ejection occurred significantly from the first character, and recorded characters were illegible.

TABLE 12

Composition and evaluation of ink

| | Pigment dispersion (pigment content: 10.0%) | | Polyurethane polymer emulsion (PU-Em) dispersion I (PU-Em content: 20.0%) | | Polymer aqueous solution (polymer content: 10.0%) | | Content ratio of PU-Em/ pigment (mass ratio) | Content ratio of PU-Em/ polymer (mass ratio) | Evaluation | | | |
|---|---|---|---|---|---|---|---|---|---|---|---|---|
| | Type | Content (percent by mass) | Type | Content (percent by mass) | Type | Content (percent by mass) | | | Scratch resistance of image | Highlighter resistance of image | Ejection stability of ink | Frequency responsibility of ink |
| Example 82 | A | 30.0 | PU-1 | 5.0 | 88 | 20.0 | 0.33 | 0.50 | B | B | A | A |
| Example 83 | B | 30.0 | PU-1 | 5.0 | 88 | 20.0 | 0.33 | 0.50 | B | B | A | A |
| Example 84 | C | 30.0 | PU-1 | 5.0 | 88 | 20.0 | 0.33 | 0.50 | B | B | A | A |
| Example 85 | D | 30.0 | PU-1 | 5.0 | 88 | 20.0 | 0.33 | 0.50 | B | B | A | A |
| Example 86 | A | 30.0 | PU-2 | 5.0 | 88 | 20.0 | 0.33 | 0.50 | B | B | A | A |
| Example 87 | A | 30.0 | PU-3 | 5.0 | 88 | 20.0 | 0.33 | 0.50 | C | C | A | A |
| Example 88 | A | 30.0 | PU-4 | 5.0 | 88 | 20.0 | 0.33 | 0.50 | B | B | A | A |
| Example 89 | A | 30.0 | PU-5 | 5.0 | 88 | 20.0 | 0.33 | 0.50 | C | C | A | A |
| Example 90 | A | 30.0 | PU-1 | 5.0 | 87 | 20.0 | 0.33 | 0.50 | B | B | B | B |
| Example 91 | A | 30.0 | PU-6 | 5.0 | 88 | 20.0 | 0.33 | 0.50 | B | B | B | B |
| Example 92 | A | 30.0 | PU-7 | 5.0 | 88 | 20.0 | 0.33 | 0.50 | B | B | B | B |
| Example 93 | A | 30.0 | PU-1 | 5.0 | 88 | 5.0 | 0.33 | 2.00 | B | B | C | B |
| Example 94 | A | 30.0 | PU-1 | 5.0 | 88 | 11.0 | 0.33 | 0.91 | B | B | A | A |
| Example 95 | A | 30.0 | PU-1 | 5.0 | 88 | 33.0 | 0.33 | 0.30 | B | B | A | A |
| Example 96 | A | 30.0 | PU-1 | 5.0 | 88 | 40.0 | 0.33 | 0.25 | B | B | B | B |
| Example 97 | A | 30.0 | PU-1 | 1.3 | 88 | 5.0 | 0.08 | 0.50 | C | C | A | A |
| Example 98 | A | 30.0 | PU-1 | 1.5 | 88 | 6.0 | 0.10 | 0.50 | B | B | A | A |
| Example 99 | A | 15.0 | PU-1 | 5.3 | 88 | 21.0 | 0.70 | 0.50 | A | A | B | B |
| Example 100 | A | 15.0 | PU-1 | 6.3 | 88 | 25.0 | 0.83 | 0.50 | A | A | C | B |
| Example 101 | A | 30.0 | PU-8 | 5.0 | 88 | 20.0 | 0.33 | 0.50 | B | B | C | C |
| Reference example 1 | A | 30.0 | — | 0 | 88 | 20.0 | 0 | 0 | D | D | A | A |

According to the examples, an ink jet ink exhibiting excellent storage stability and ejection stability can be provided, wherein a bronze phenomenon is suppressed while the glossiness of an image is maintained. Furthermore, an ink cartridge by using the above-described ink and an ink jet recording method can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-193848 filed Aug. 31, 2010 and No. 2010-194043 filed Aug. 31, 2010, each of which are hereby incorporated by reference herein in their entirety.

What is claimed is:

1. An ink jet ink comprising:
a pigment and an ABC triblock polymer,
wherein the ABC triblock polymer is formed from an A block having an aryl group, a B block having a unit represented by the following general formula (1), and a C block having a unit represented by the following general formula (2),

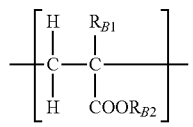

General formula (1)

in the general formula (1), $R_{B1}$ represents a hydrogen atom or a methyl group and $R_{B2}$ represents an alkyl group having the carbon number of 1 to 8, a cycloalkyl group having the carbon number of 4 to 8, or a hydroxy alkyl group having the carbon number of 2 to 8, and

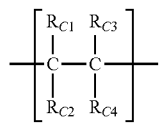

General formula (2)

in the general formula (2), at least one of $R_{C1}$ to $R_{C4}$ is a —COOH group, an —$R_{C5}$—COOH group, or a salt thereof, the remainder is a hydrogen atom, an alkyl group having the carbon number of 1 to 8, or a cycloalkyl group having the carbon number of 4 to 8, and $R_{C5}$ is an alkylene group having the carbon number of 1 to 5

2. The ink jet ink according to claim 1, wherein an acid value of the ABC triblock polymer is 20 mgKOH/g or more and 150 mgKOH/g or less.

3. The ink jet ink according to claim 1, wherein the proportion (percent by mass) of the A block in the ABC triblock polymer is 20.0 percent by mass or more and 80.0 percent by mass or less relative to a total mass of the ABC triblock polymer.

4. The ink jet ink according to claim 1, wherein a number average molecular weight of the ABC triblock polymer is 1,000 or more and 30,000 or less.

5. The ink jet ink according to claim 1, wherein the ABC triblock polymer has a molecular weight distribution satisfying 1.0≤(weight average molecular weight)/(number average molecular weight)≤2.0.

6. The ink jet ink according to claim 1, wherein the proportion (percent by mass) of the A block in the ABC triblock polymer is 5.0 times or more and 15.0 times or less the proportion (percent by mass) of units derived from all acidic monomers contained in the ABC triblock polymer.

7. The ink jet ink according to claim 1, wherein the ratio of the number average molecular weight of the ABC triblock polymer to the acid value of the ABC triblock polymer is 50 or more and 200 or less.

8. The ink jet ink according to claim 1, wherein the content (percent by mass) of the ABC triblock polymer in the ink jet ink is 0.2 times or more and 0.5 times or less the content (percent by mass) of the pigment on a mass ratio basis.

9. The ink jet ink according to claim 1, wherein the ink further comprises a polyurethane polymer emulsion having a unit derived from a polyether polyol.

10. The ink jet ink according to claim 9, wherein the content (percent by mass) of the polyurethane polymer emulsion relative to a total mass of the ink is 0.10 times or more and 0.70 times or less the content (percent by mass) of the pigment on a mass ratio basis.

11. The ink jet ink according to claim 9, wherein the content (percent by mass) of the polyurethane polymer emulsion relative to a total mass of the ink is 0.30 times or more and less than 1.00 time of the content (percent by mass) of the ABC triblock polymer on a mass ratio basis.

12. The ink jet ink according to claim 9, wherein the polyether polyol is a polypropylene glycol.

13. An ink cartridge comprising an ink storage portion to store an ink, wherein the ink stored in the ink storage portion is the ink jet ink according to claim 1.

14. An ink jet recording method comprising the step of ejecting an ink by an ink jet method from an ink jet recording head to perform recording on a recording medium, wherein the ink is the ink jet ink according to claim 1.

* * * * *